US012302416B2

(12) United States Patent
Kim et al.

(10) Patent No.: US 12,302,416 B2
(45) Date of Patent: May 13, 2025

(54) COMMUNICATION RELATED TO MULTI ACCESS PDU SESSION

(71) Applicant: LG Electronics Inc., Seoul (KR)

(72) Inventors: Laeyoung Kim, Seoul (KR); Sungduck Chun, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 17/798,964

(22) PCT Filed: Feb. 15, 2021

(86) PCT No.: PCT/KR2021/001872
§ 371 (c)(1),
(2) Date: Aug. 11, 2022

(87) PCT Pub. No.: WO2021/162500
PCT Pub. Date: Aug. 19, 2021

(65) Prior Publication Data
US 2023/0071408 A1   Mar. 9, 2023

(30) Foreign Application Priority Data

Feb. 13, 2020 (KR) .................. 10-2020-0017881

(51) Int. Cl.
*H04W 76/10* (2018.01)
*H04W 80/10* (2009.01)
(52) U.S. Cl.
CPC ............ *H04W 76/10* (2018.02); *H04W 80/10* (2013.01)
(58) Field of Classification Search
CPC ..... H04W 76/10; H04W 80/10; H04W 76/12; H04W 28/02; H04L 65/1016; H04L 65/1073; H04L 65/1104
See application file for complete search history.

(56) References Cited

U.S. PATENT DOCUMENTS 10,862,746 B2 * 12/2020 Buckley ................. H04M 15/73
11,122,532 B2 *  9/2021 Kim ..................... H04L 65/1073
(Continued)

FOREIGN PATENT DOCUMENTS

WO    WO 2018007214    1/2018

OTHER PUBLICATIONS

3GPP TS 23.228 V16.3.0 (Dec. 2019), "3rd Generation Partnership Project; Technical Specification Group Services and System Aspects; IP Multimedia Subsystem (IMS); Stage 2 (Release 16)," Dec. 2019, 349 pages.

(Continued)

*Primary Examiner* — Jay P Patel
(74) *Attorney, Agent, or Firm* — Fish & Richardson P.C.

(57) ABSTRACT

Provided in one embodiment of the present specification is a method by which an IMS AS performs communication related to a MA PDU session. The method can comprise the steps of: receiving, through a P-CSCF and a S-CSCF, a SIP registration message generated by means of UE, the SIP registration message including information that an IMS service is performed through the MA PDU session, and the SIP registration message including state information that the state of a PS data off of the UE is active; receiving, from the S-CSCF, an SIP request message for requesting the IMS service from the UE; checking whether the IMS service corresponds to an exempt service of the PS data off; including the checked result in the SIP request message; and transmitting the SIP request message to a UPF through the S-CSCF and the P-CSCF.

7 Claims, 17 Drawing Sheets

(56) References Cited

U.S. PATENT DOCUMENTS

| | | | | |
|---|---|---|---|---|
| 11,539,763 | B2* | 12/2022 | Oyman | ............... H04L 65/1073 |
| 2019/0190775 | A1* | 6/2019 | Buckley | ............... H04L 65/1104 |
| 2019/0357090 | A1* | 11/2019 | Drevon | ................... H04W 4/24 |
| 2020/0154390 | A1* | 5/2020 | Kim | ........................ H04W 8/26 |

OTHER PUBLICATIONS

3GPP TS 23.503 V16.3.0 (Dec. 2019), "3rd Generation Partnership Project; Technical Specification Group Services and System Aspects; Policy and charging control framework for the 5G System (5GS); Stage 2 (Release 16)," Dec. 2019, 112 pages.

Ericsson, "Applicability of Data Off to Non-3GPP PDU Session and Multi Access PDU Session," SA WG2 Meeting #S2-136AH, S2-2000287, Incheon, South Korea, Jan. 13-17, 2020, 2 pages.

Huawei et al., "Support of MA-PDU session," 3GPP TSG-SA WG2 Meeting #130, S2-1900463, Jan. 21-25, 2019, Kochi, India, 14 pages.

* cited by examiner

COMMUNICATION RELATED TO MULTI ACCESS PDU SESSION

CROSS-REFERENCE TO RELATED APPLICATIONS

This application is a National Stage application under 35 U.S.C. § 371 of International Application No. PCT/KR2021/001872, filed on Feb. 15, 2021, which claims the benefit of Korean Patent Application No. 10-2020-0017881, filed on Feb. 13, 2020. The disclosures of the prior applications are hereby incorporated by reference herein in their entirety.

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems, 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, in 5G mobile communication, the 3rd Generation Partnership Project (3GPP) Packet Switch (PS) Data Off function may be used. Discussion is ongoing that 3GPP PS Data Off should be supported even for Multi Access (MA) Packet Data Unit (PDU) sessions. However, conventionally, w % ben 3GPP PS Data Off is used for the MA PDU session, there is a problem in providing the IMS service.

SUMMARY

In case of PS Data off in MA PDU session, IMS (Internet protocol Multimedia Subsystem) service must be effectively provided.

For solving the above-mentioned problems, this specification provides a method for performing communication related to MA (Multi Access) PDU (Packet Data Unit) session, performed by an IMS AS (Internet Protocol Multimedia Subsystem Application Server). The method is comprising: receiving an SIP (Session Initiation Protocol) registration message generated by an UE (User Equipment) via a P-CSCF (Proxy-Call Session Control Function) and an S-CSCF (Serving Call Session Control Function); wherein the SIP registration message includes information that an IMS (Internet Protocol Multimedia Subsystem) service is performed through the MA PDU session, wherein the SIP registration message includes status information indicating that a state of PS Data Off of the UE is active; receiving an SIP request message for requesting the IMS service for the UE from the S-CSCF; checking whether the IMS service corresponds to PS Data Off exempt service; including the checked result in the SIP request message; and transmitting the SIP request message to a UPF (User Plane Function) through the S-CSCF and the P-CSCF.

The present specification may have various effects.

For example, through the method disclosed herein, the IMS service can be effectively provided to the UE in the MA PDU session.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 12 is a flowchart illustrating a procedure performed by the AS.

DETAILED DESCRIPTION

Figure 1:
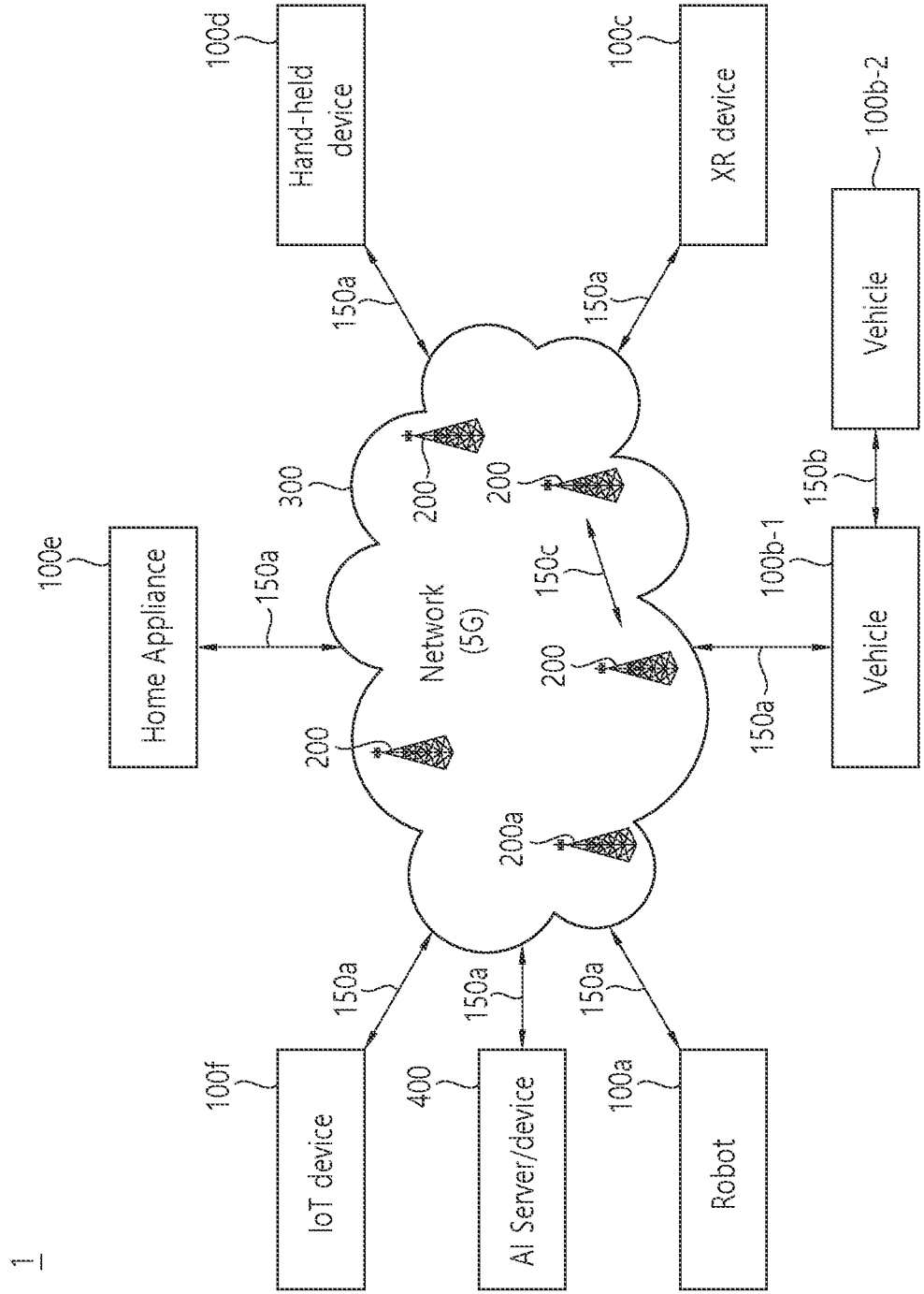
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, user equipment (UE) is illustrated by way of example, but the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and an evolved-NodeB (eNodeB), an evolved-NodeB (eNB), a BTS (Base Transceiver System), an access point (Access Point), may be called other terms such as gNB (Next generation NodeB).

I. Techniques and Procedures Applicable to the Disclosure of this Specification

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M. and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
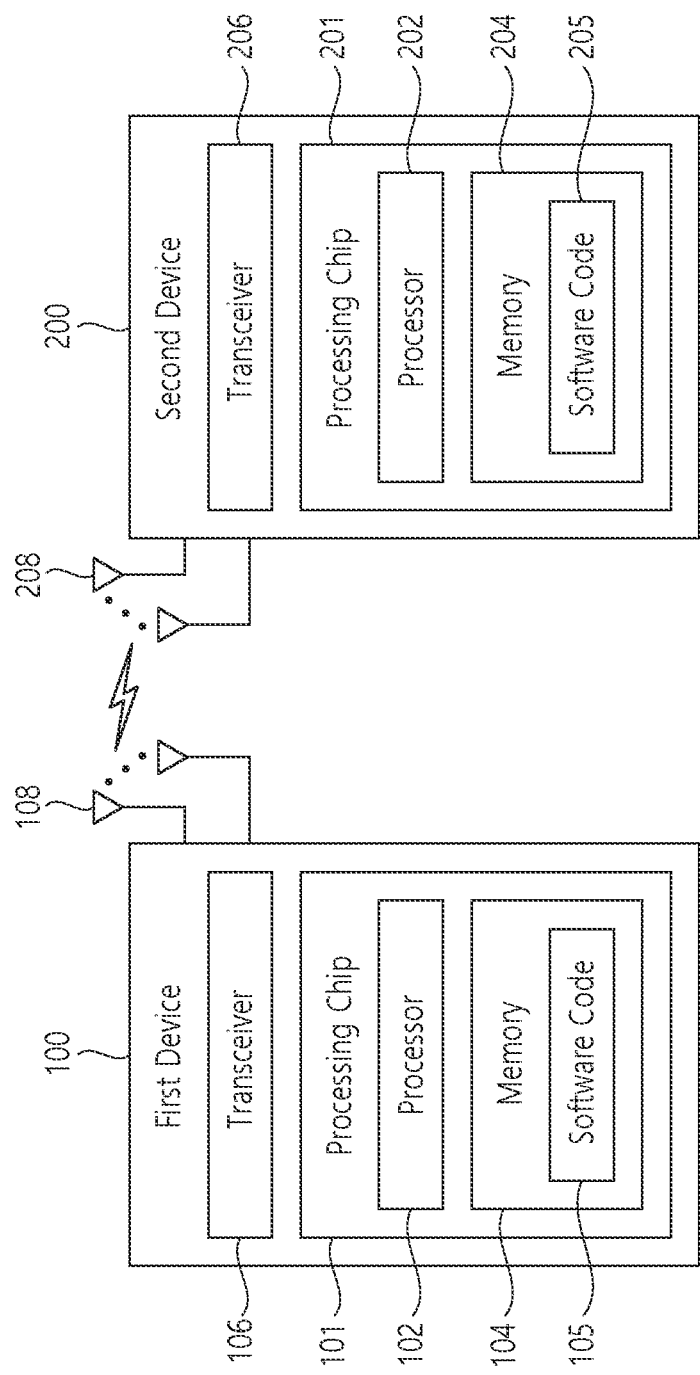
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
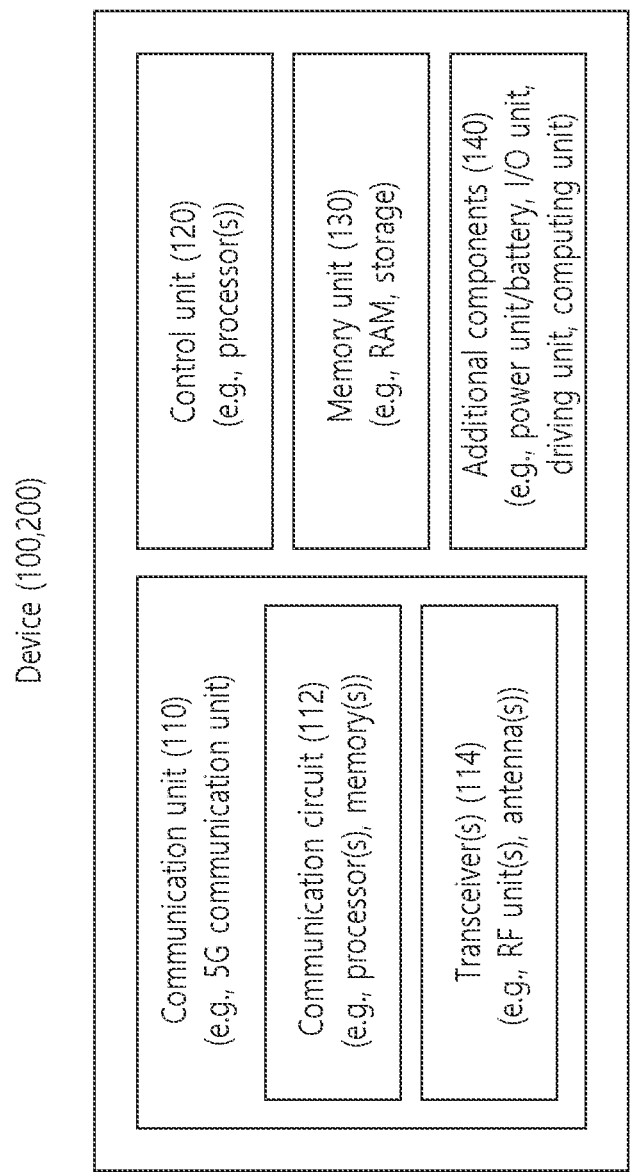
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG.

1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
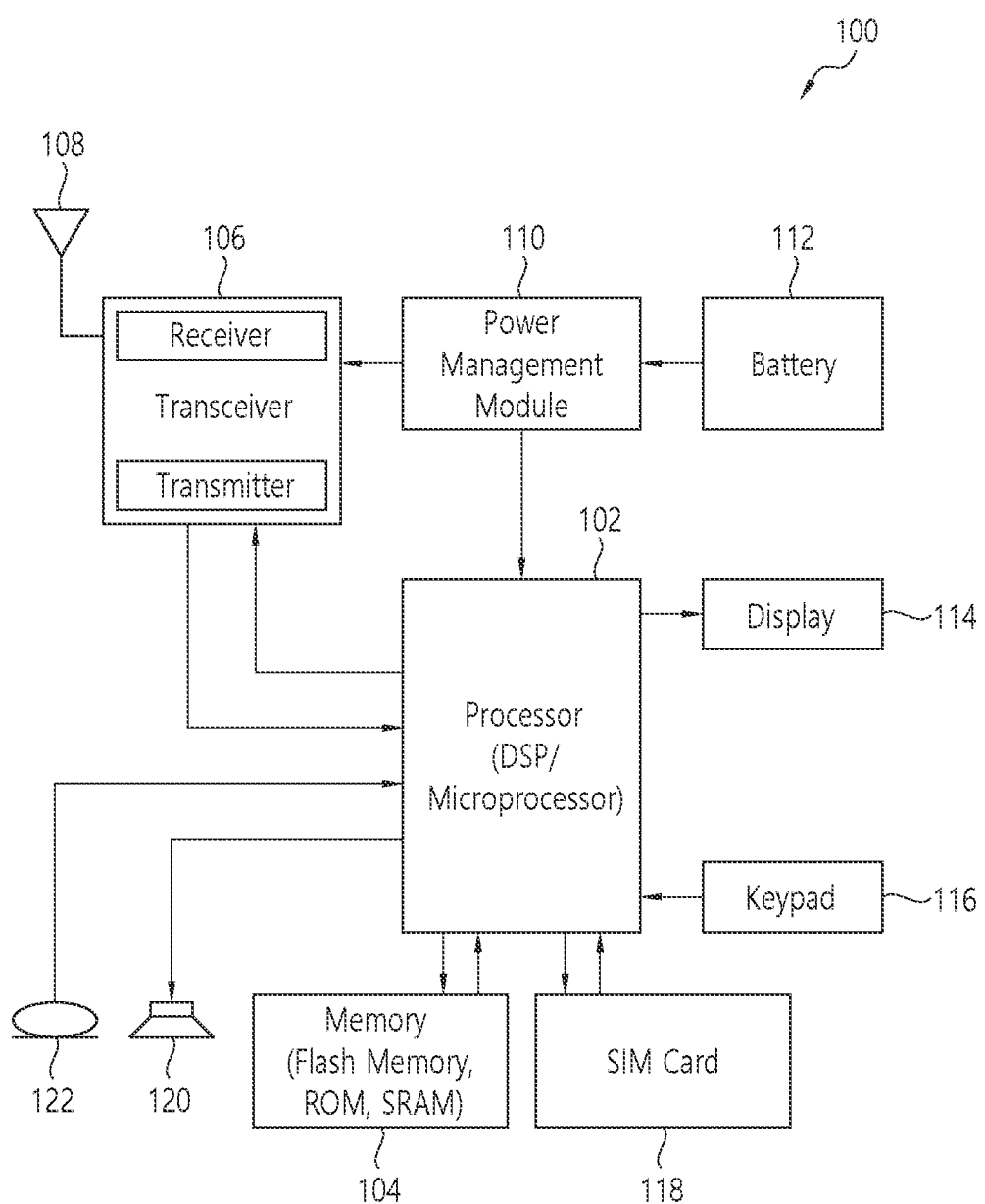
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
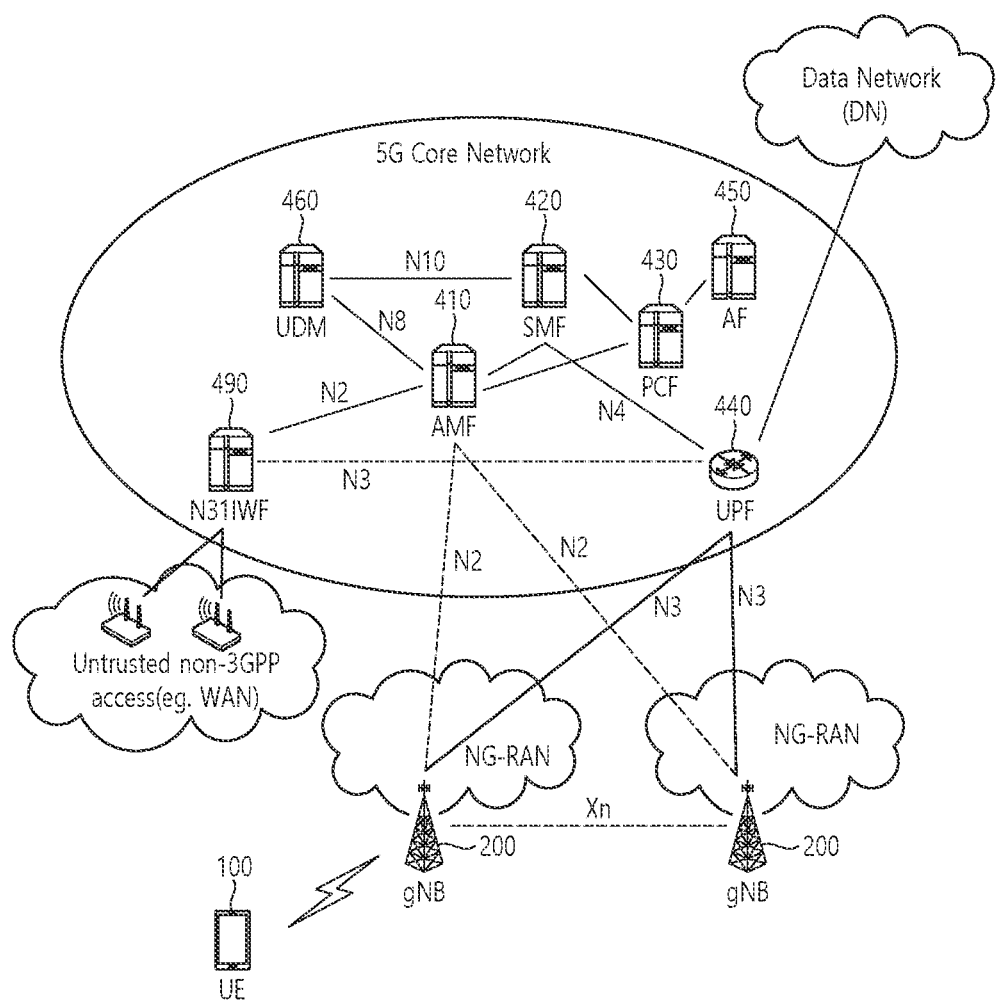
FIG. 5 is a structural diagram of a next-generation mobile communication network.

FIG. 5 is a structural diagram of a next-generation mobile communication network.

5GC (5G Core) may include various components, and in FIG. 1, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network via the UPF 440 through a Next Generation Radio Access Network (NG-RAN) including the gNB 20.

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

The illustrated N3IWF 490 performs a function of managing interworking between non-3GPP access and 5G systems. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through the N3 interface for data transmission.

The illustrated AMF 410 may manage access and mobility in a 5G system. The AMF 410 may perform a function of managing Non-Access Stratum (NAS) security. The AMF 410 may perform a function of handling mobility in an idle state.

The illustrated UPF 440 is a type of gateway through which user data is transmitted and received. The UPF node 440 may perform all or part of the user plane functions of a Serving Gateway (S-GW) and a Packet Data Network Gateway (P-GW) of 4G mobile communication.

The UPF 440 is an element that operates as a boundary point between the next generation RAN (NG-RAN) and the core network, and maintains a data path between the gNB 20 and the SMF 420. Also, when the UE 100 moves over an area served by the gNB 20, the UPF 440 serves as a mobility anchor point. The UPF 440 may perform a function of handling PDUs. For mobility within NG-RAN (Next Generation-Radio Access Network defined after 3GPP Release-15), UPF packets can be routed. In addition, the UPF 440 is another 3GPP network (RAN defined before 3GPP Release-15, for example, UTRAN, E-UTRAN (Evolved-Universal Mobile Telecommunications System (UMTS) Terrestrial Radio Access Network)) or GERAN (GSM (GSM)). It may function as an anchor point for mobility with Global System for Mobile Communication/EDGE (Enhanced Data rates for Global Evolution) Radio Access Network). UPF 440 may correspond to a termination point of a data interface towards a data network.

The illustrated PCF 430 is a node that controls the operator's policy.

The illustrated AF 450 is a server for providing various services to the UE 100.

The illustrated UDM 460 is a kind of server that manages subscriber information, like a home subscriber server (HSS) of 4G mobile communication. The UDM 460 stores and manages the subscriber information in a Unified Data Repository (UDR).

The illustrated SMF 420 may perform a function of allocating an Internet Protocol (IP) address of the UE. In addition, the SMF 420 may control a protocol data unit (PDU) session.

For reference, in the following AMF (410), SMF (420), PCF (430), UPF (440), AF (450), UDM (460), N3IWF (490), gNB (20), or UE (100) Reference numerals for may be omitted.

5G mobile communication supports multiple numerology or subcarrier spacing (SCS) to support various 5G services. For example, when SCS is 15 kHz, it supports a wide area in traditional cellular bands, and when SCS is 30 kHz/60 kHz, dense-urban, lower latency and wider carrier bandwidth, and when SCS is 60 kHz or higher, a bandwidth greater than 24.25 GHz to overcome phase noise.

Figure 6:
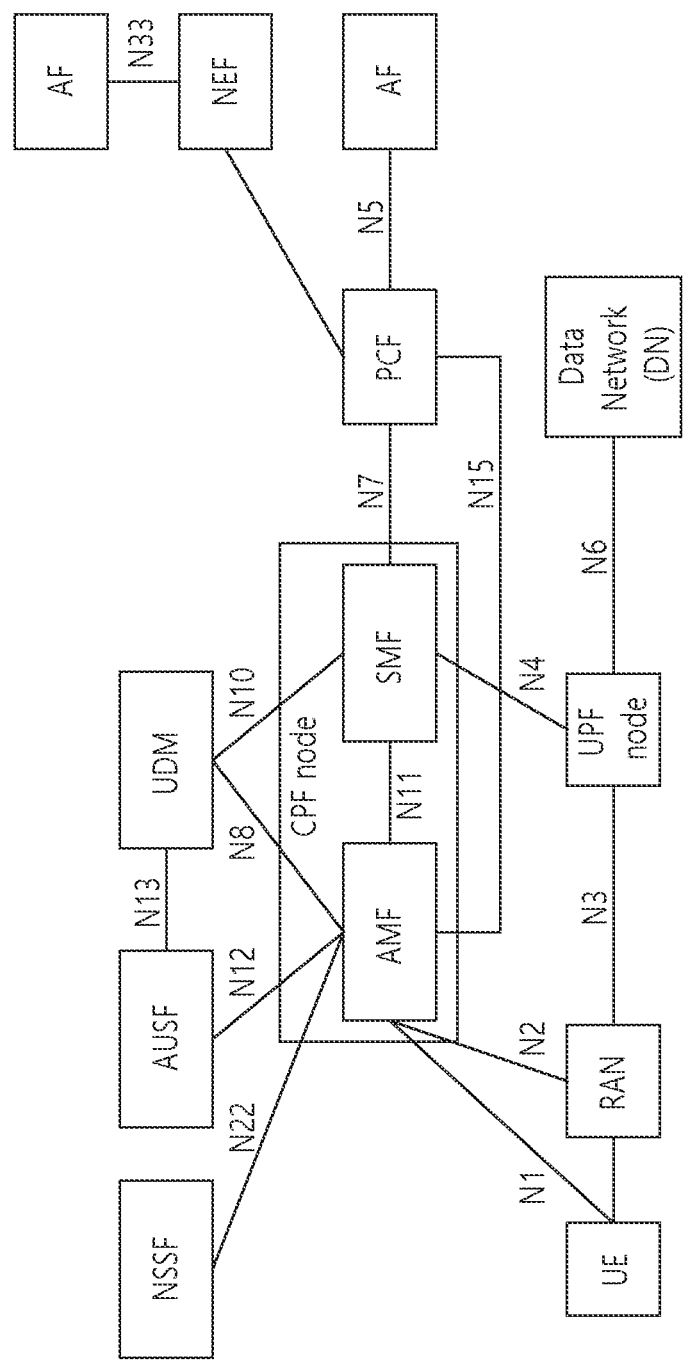
FIG. 6 is an exemplary diagram illustrating an expected structure of next-generation mobile communication from the viewpoint of a node.

FIG. 6 is an exemplary diagram illustrating an expected structure of next-generation mobile communication from the viewpoint of a node.

As can be seen with reference to FIG. 6, the UE is connected to a data network (DN) through a next-generation RAN (Radio Access Network).

The illustrated control plane function (CPF) node carries out all or part of the functions of the MME (Mobility Management Entity) of the 4th generation mobile communication, and out all or part of the control plane functions of a Serving Gateway (S-GW) and a PDN Gateway (P-GW). The CPF node includes an Access and Mobility Management Function (AMF) and a Session Management Function (SMF).

The illustrated User Plane Function (UPF) node is a type of gateway through which user data is transmitted and received. The UPF node may perform all or part of the user plane functions of the S-GW and P-GW of 4G mobile communication.

The illustrated PCF (Policy Control Function) is a node that controls the operator's policy.

The illustrated application function (Application Function: AF) is a server for providing various services to the UE.

The illustrated unified data management (UDM) is a kind of server that manages subscriber information, like a home subscriber server (HSS) of 4G mobile communication. The UDM stores and manages the subscriber information in a Unified Data Repository (UDR).

The illustrated Authentication Server Function (AUSF) authenticates and manages the UE.

The illustrated network slice selection function (NSSF) is a node for network slicing as will be described later.

The illustrated Network Exposure Function (NEF) is a node for providing a mechanism for securely exposing the services and functions of the 5G core. For example, NEF may expose functions and events, may securely provide information from external applications to the 3GPP network, may translate internal/external information, may provide control plane parameters, and may manage packet flow description (PFD).

Figure 7:
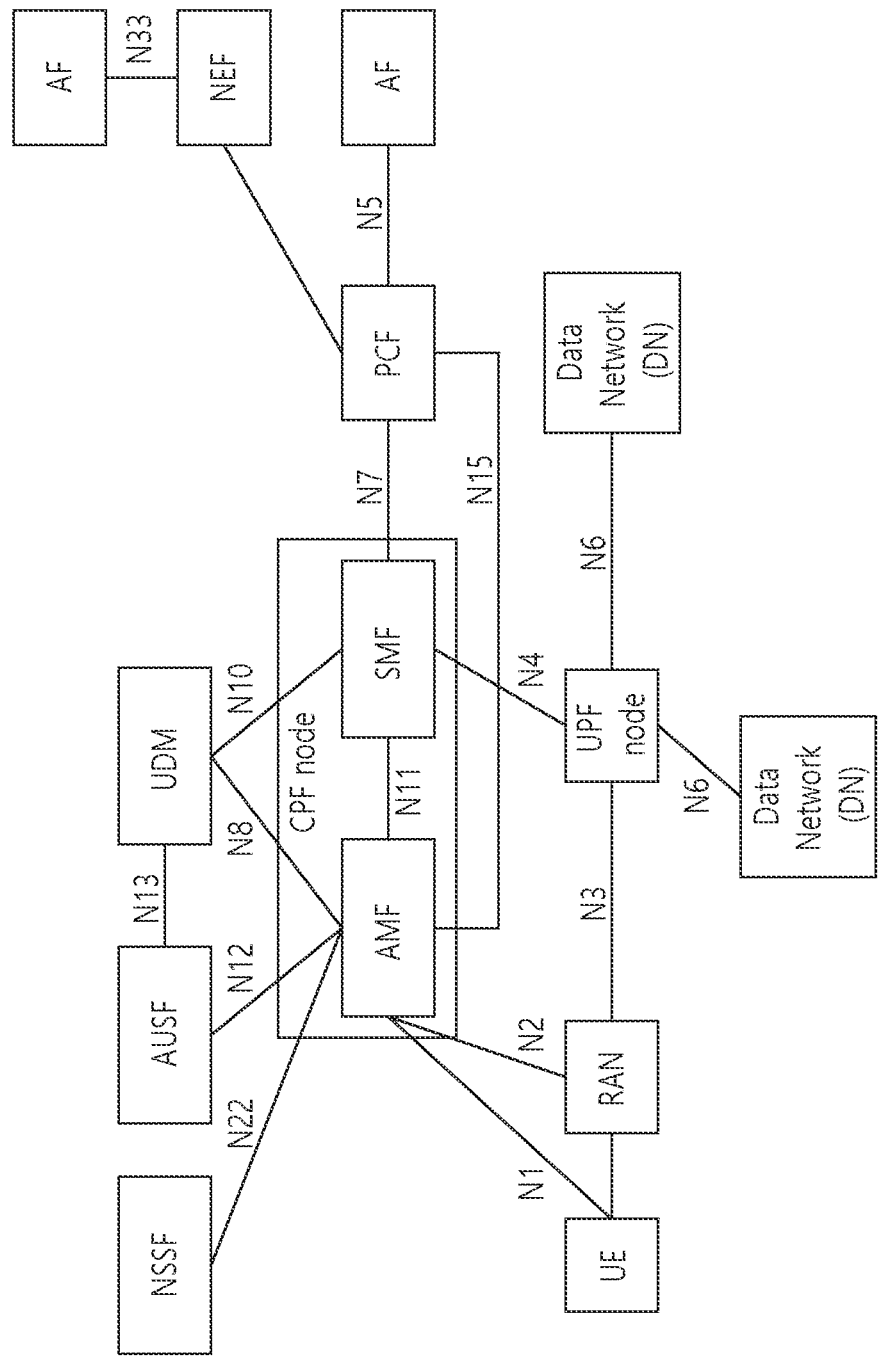
FIG. 7 is an exemplary diagram illustrating an architecture for supporting simultaneous access to two data networks.

In FIG. 7, a UE may simultaneously access two data networks using multiple PDU (protocol data unit or packet data unit) sessions.

FIG. 7 is an exemplary diagram illustrating an architecture for supporting simultaneous access to two data networks.

FIG. 7 shows an architecture for a UE to simultaneously access two data networks using one PDU session.

Reference points shown in FIGS. 6 and 7 are as follows.

N1 represents a reference point between the UE and the AMF.

N2 represents a reference point between (R)AN and AMF.

N3 represents the reference point between (R)AN and UPF.

N4 represents a reference point between SMF and UPF.

N5 represents the reference point between PCF and AF.

N6 represents a reference point between UPF and DN.

N7 represents a reference point between SMF and PCF.

N8 represents a reference point between UDM and AMF.

N9 represents a reference point between UPFs.

N10 represents a reference point between the UDM and the SMF.

N11 represents a reference point between AMF and SMF.

N12 represents a reference point between AMF and AUSF.

N13 represents a reference point between UDM and AUSF.

N14 represents a reference point between AMFs.

N15 represents a reference point between the PCF and the AMF in a non-roaming scenario, and a reference point between the AMF and the PCF of a visited network in a roaming scenario.

N16 represents a reference point between SMFs.

N22 represents a reference point between the AMF and the NSSF.

N30 represents a reference point between the PCF and the NEF.

N33 denotes a reference point between AF and NEF.

For reference, in FIGS. 6 and 7, AF by a third party other than an operator may be connected to 5GC through NEF.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving from an idle mode to a new tracking area (TA), and when the UE needs to perform periodic registration update.

During the initial registration procedure, the ID of the UE may be obtained from the UE. AMF can pass PEI (IMEISV) to UDM. SMF and PCF.

Figure 8A:
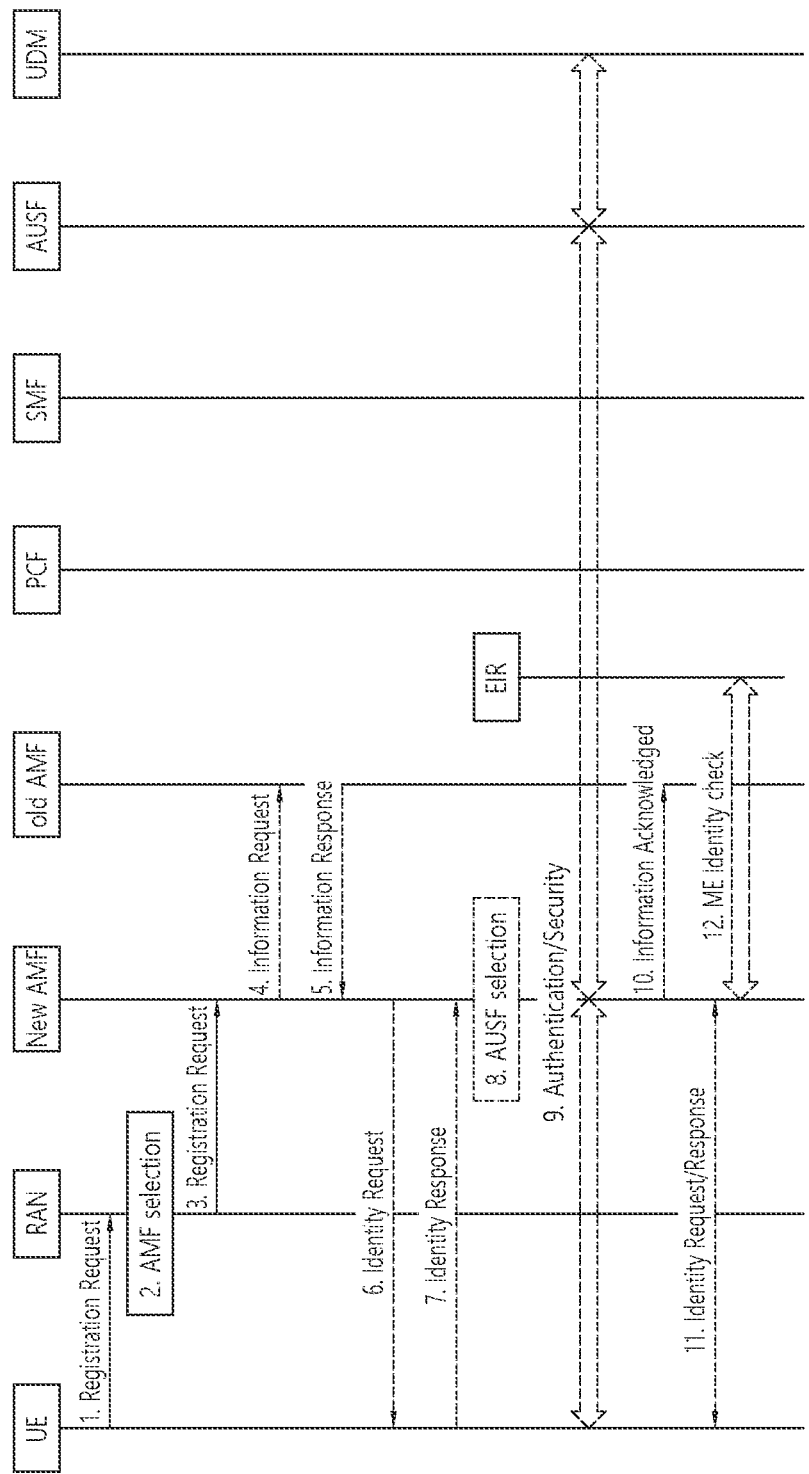
FIG. 8A and FIG. 8B are signal flow diagrams illustrating an exemplary registration procedure.
Figure 8B:
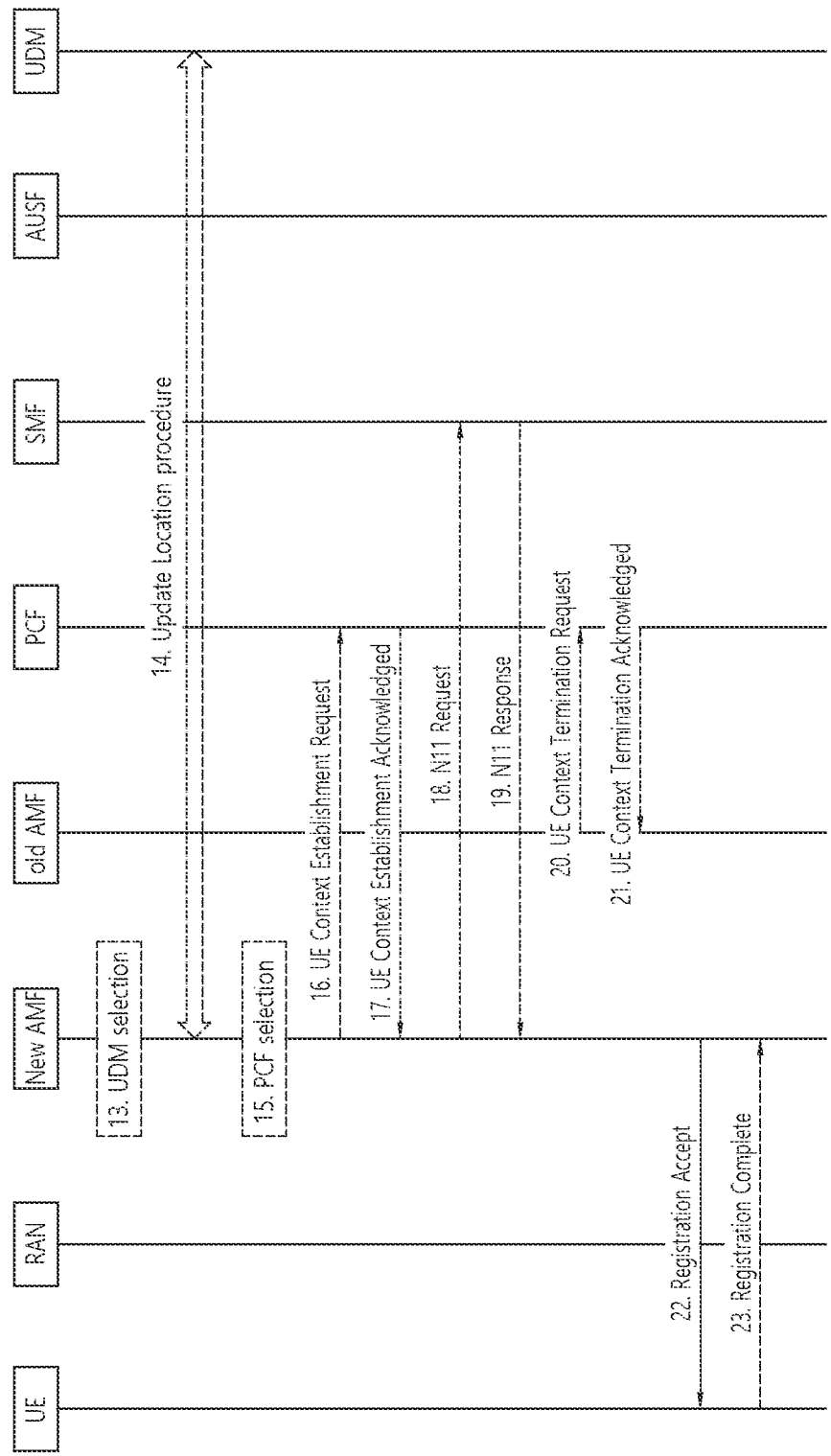

FIG. 8A and FIG. 8B are signal flow diagrams illustrating an exemplary registration procedure.

1) The UE may send an AN message to the RAN. The AN message may include an AN parameter and a registration request message. The registration request message may include information such as registration type, subscriber permanent ID or temporary user ID, security parameters, network slice selection assistance information (NSSAI), 5G capability of the UE, protocol data unit (PDU) session state, and the like.

In the case of 5G RAN, the AN parameters may include a Subscription Permanent Identifier (SUPI) or a temporary user ID, a selected network, and an NSSAI.

The registration type is "initial registration" (i.e. the UE is in a non-registered state), "Mobility registration update" (i.e. the UE is in a registered state and initiates the registration procedure due to mobility) or "Regular registration update" (That is, the UE is in the registered state and starts the registration procedure due to the expiration of the periodic update timer). When the temporary user ID is included, the temporary user ID indicates the last serving AMF. If the UE is already registered via non-3GPP access in a PLMN different from the Public Land Mobile Network (PLMN) of 3GPP access, the UE may not provide the temporary ID of the UE assigned by the AMF during the registration procedure via non-3GPP access.

Security parameters can be used for authentication and integrity protection.

The PDU session state may indicate a (previously established) PDU session usable in the UE.

2) If SUPI is included or the temporary user ID does not indicate a valid AMF, the RAN may select an AMF based on (R)AT and NSSAI.

If the (R)AN cannot select an appropriate AMF, it selects an arbitrary AMF according to a local policy, and transmits a registration request to the selected AMF. If the selected AMF cannot service the UE, the selected AMF selects another more suitable AMF for the UE.

3) The RAN transmits an N2 message to the new AMF. The N2 message includes an N2 parameter and a registration request. The registration request may include registration type, subscriber permanent identifier or temporary user ID, security parameters, NSSAI and MICO mode default settings, and the like.

When 5G-RAN is used, the N2 parameter includes location information related to the cell in which the UE is camping, a cell identifier, and a RAT type.

If the registration type indicated by the UE is periodic registration update, steps 4 to 17 to be described later may not be performed.

4) The newly selected AMF may transmit an information request message to the previous AMF.

If the temporary user ID of the UE is included in the registration request message and the serving AMF has changed since the last registration, the new AMF may send an information request message containing the complete registration request information to the old AMF to request the SUPI and MM context of the UE.

5) The previous AMF transmits an information response message to the newly selected AMF. The information response message may include SUPI, MM context, and SMF information.

Specifically, the previous AMF sends an information response message including the UE's SUPI and MM context.

If the previous AMF has information on the active PDU session, the previous AMF may include SMF information including the ID of the SMF and the PDU session ID in the information response message.

6) The new AMF sends an Identity Request message to the UE if the SUPI is not provided by the UE or retrieved from the previous AMF.

7) The UE transmits an Identity Response message including the SUPI to the new AMF.

8) AMF may decide to trigger AUSF. In this case, the AMF may select the AUSF based on the SUPI.

9) AUSF may initiate authentication of UE and NAS security functions.

10) The new AMF may transmit an information response message to the previous AMF.

If the AMF is changed, the new AMF may transmit the information response message to confirm delivery of the UE MM context.

If the authentication/security procedure fails, registration is rejected and the new AMF can send a rejection message to the old AMF.

11) The new AMF may transmit an Identity Request message to the UE.

If the PEI was not provided by the UE or was not retrieved from the previous AMF, an Identity Request message may be sent for the AMF to retrieve the PEI.

12) The new AMF checks the ME identifier.

13) If step 14 to be described later is performed, the new AMF selects a UDM based on SUPI.

14) If the AMF is changed after the last registration, there is no valid subscription context for the UE in the AMF, or the UE provides a SUPI that does not refer to a valid context in the AMF, the new AMF starts the Update Location procedure. Alternatively, it may be started even when the UDM starts the location cancellation (Cancel Location) for the previous AMF. The old AMF discards the MM context and notifies all possible SMF(s), and the new AMF creates the MM context for the UE after obtaining the AMF related subscription data from the UDM.

When network slicing is used, the AMF obtains the allowed NSSAI based on the requested NSSAI, UE subscription and local policy. Reroute registration requests if AMF is not eligible to support allowed NSSAI.

15) The new AMF may select a PCF based on SUPI.

16) The new AMF transmits a UE Context Establishment Request message to the PCF. The AMF may request an operator policy for the UE from the PCF.

17) The PCF transmits a UE Context Establishment Acknowledged message to the new AMF.

18) The new AMF transmits an N11 request message to the SMF.

Specifically, when the AMF is changed, the new AMF notifies each SMF of the new AMF serving the UE. The AMF verifies the PDU session state from the UE with the available SMF information. When the AMF is changed, available SMF information may be received from the previous AMF. The new AMF may request the SMF to release the network resources related to the PDU session not active in the UE.

19) The new AMF transmits an N11 response message to the SMF.

20) The previous AMF transmits a UE Context Termination Request message to the PCF.

If the previous AMF has previously requested that the UE context be established in the PCF, the old AMF may delete the UE context from the PCF.

21) The PCF may transmit a UE Context Termination Request message to the previous AMF.

22) The new AMF transmits a registration accept message to the UE. The registration acceptance message may include temporary user ID, registration area, mobility restriction, PDU session status, NSSAI, regular registration update timer, and allowed MICO mode.

The registration accept message may include information of the allowed NSSAI and the mapped NSSAI. The allowed NSSAI information for the access type of the UE may be included in the N2 message including the registration accept message. The mapped NSSAI information is information that maps each S-NSSAI of the allowed NSSAI to the S-NASSI of the NSSAI configured for HPLMN.

When the AMF allocates a new temporary user ID, the temporary user ID may be further included in the registration acceptance message. When the mobility restriction is applied to the UE, information indicating the mobility restriction may be additionally included in the registration accept message. The AMF may include information indicating the PDU session state for the UE in the registration accept message. The UE may remove any internal resources associated with a PDU session not marked as active in the received PDU session state. If the PDU session state information is in the Registration Request message, the AMF may include information indicating the PDU session state to the UE in the registration accept message.

23) The UE transmits a registration complete message to the new AMF.

<PDU Session Establishment Procedure>

In the protocol data unit (PDU) session establishment procedure, two types of PDU session establishment procedures may exist as follows.

PDU session establishment procedure initiated by the UE
PDU session establishment procedure initiated by the network. To this end, the network may send a device trigger message to the application(s) of the UE.

Figure 9A:
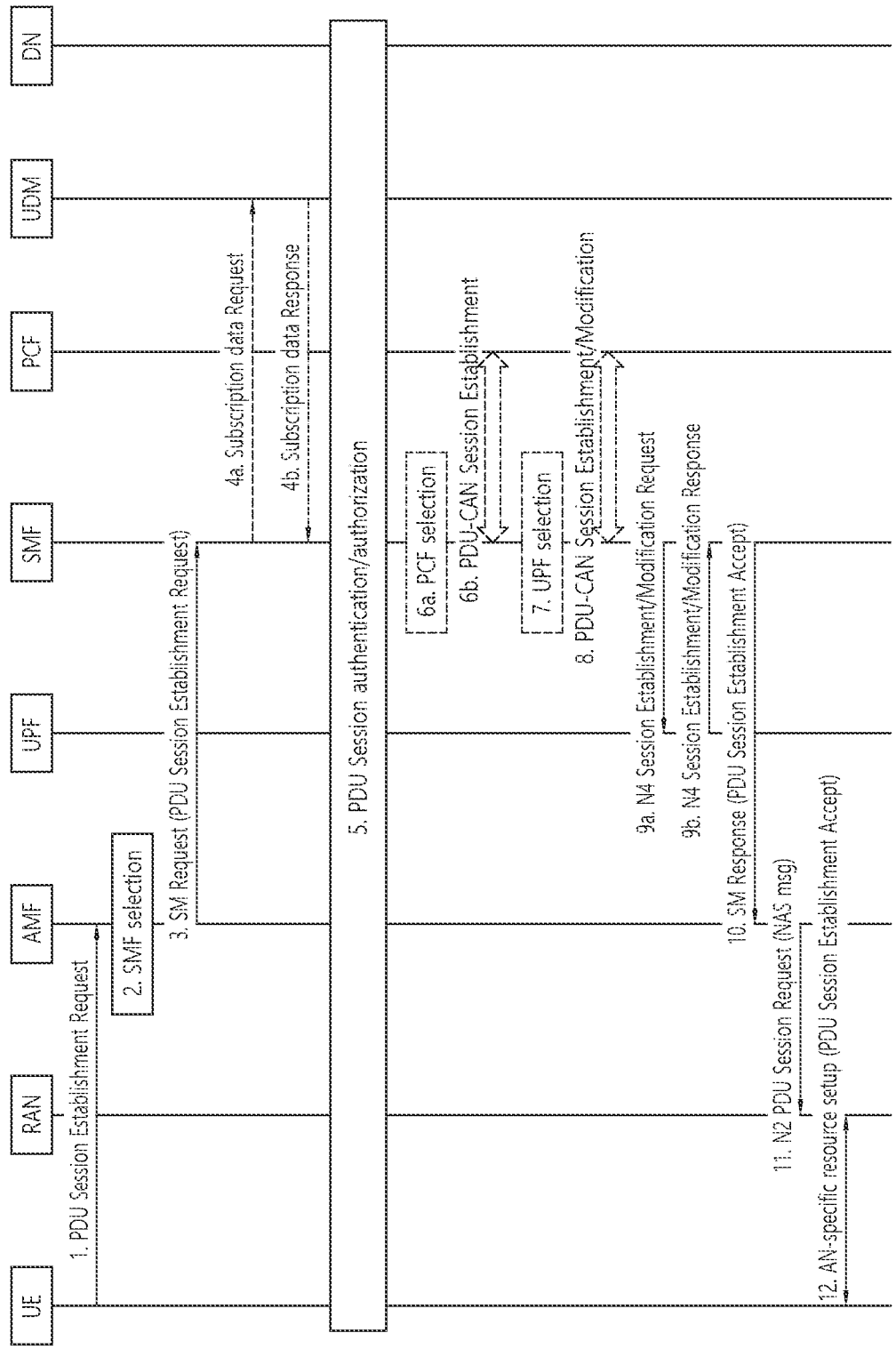
FIG. 9A and FIG. 9B are signal flow diagrams illustrating an exemplary PDU session establishment procedure.
Figure 9B:
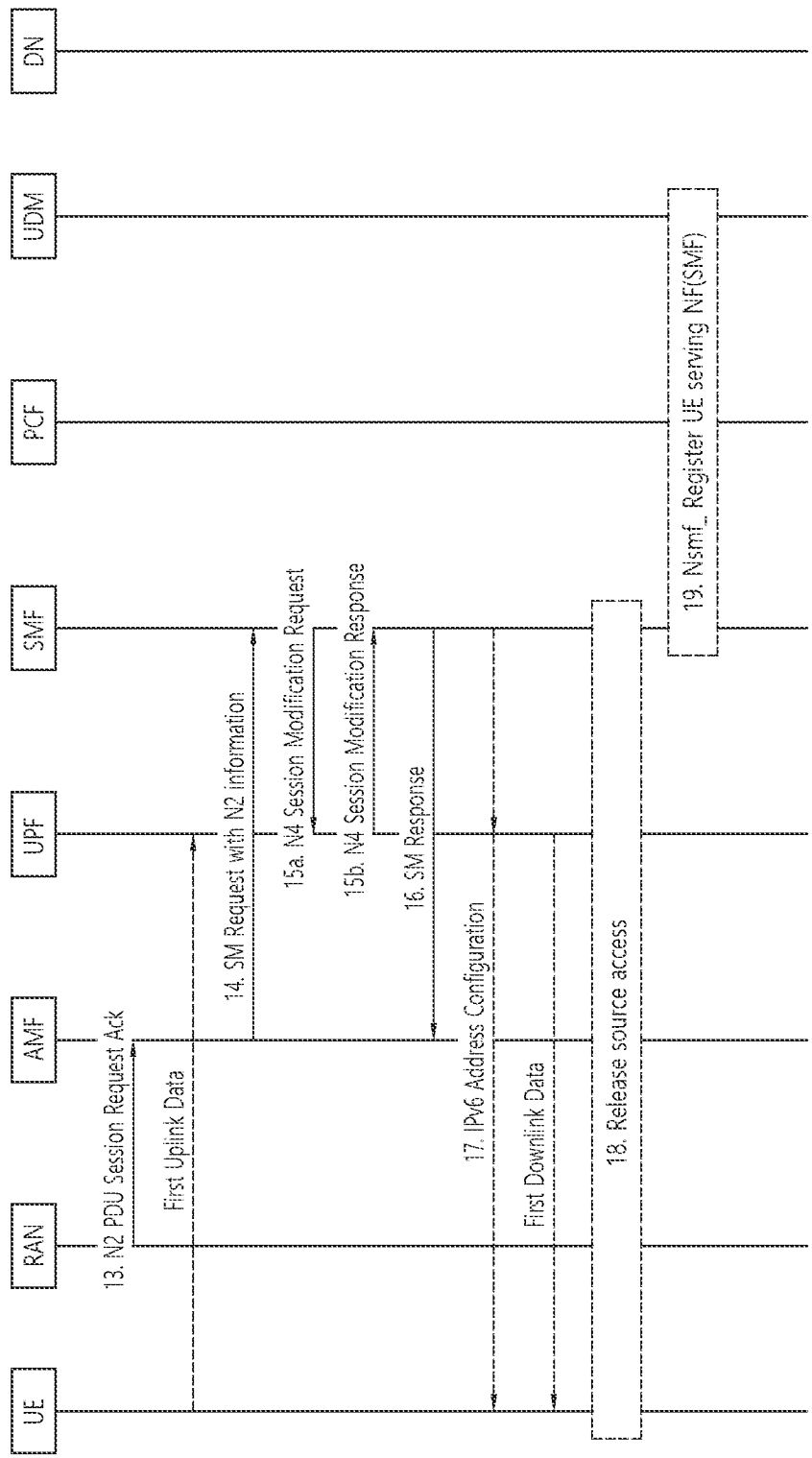

FIG. 9A and FIG. 9B are signal flow diagrams illustrating an exemplary PDU session establishment procedure.

The procedure shown in FIGS. 9A and 9B assumes that the UE has already registered with the AMF according to the registration procedure shown in FIG. 8A and FIG. 8B. Therefore, it is assumed that the AMF has already obtained the user subscription data from the UDM.

1) The UE sends a NAS message to the AMF. The message may include Session Network Slice Selection Assistance Information (S-NSSAI), DNN, PDU session ID, request type, N1 SM information, and the like.

Specifically, the UE includes the S-NSSAI from the allowed NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information in which each S-NSSAI of the allowed NSSAI is mapped to an S-NASSI of an NSSAI configured for HPLMN.

More specifically, the UE may extract and store the information of the allowed S-NSSAI and the mapped S-NSSAI included in the registration accept message received from the network (ie, AMF) in the registration procedure of FIG. 8A and FIG. 8B. Accordingly, the UE may transmit the PDU session establishment request message by including both the S-NSSAI based on the allowed NSSAI and the corresponding S-NSSAI based on the mapped NSSAI information.

To establish a new PDU session, the UE may generate a new PDU session ID.

The UE may start the PDU session establishment procedure initiated by the UE by sending a NAS message including the PDU session establishment request message in the N1 SM information. The PDU session establishment request message may include a request type, an SSC mode, and a protocol configuration option.

When the PDU session establishment is for establishing a new PDU session, the request type indicates "initial request". However, when there is an existing PDU session between 3GPP access and non-3GPP access, the request type may indicate "existing PDU session".

The NAS message transmitted by the UE is encapsulated in the N2 message by the AN. The N2 message is transmitted to the AMF and may include user location information and access technology type information.

N1 SM information may include an SM PDU DN request container including information on PDU session authentication by external DN.

2) The AMF may determine that the message corresponds to a request for a new PDU session when the message indicates that the request type is "initial request" and the PDU session ID is not used for the existing PDU session of the UE.

If the NAS message does not include the S-NSSAI, the AMF may determine the default S-NSSAI for the requested PDU session according to the UE subscription. The AMF may store the PDU session ID and the SMF ID in association.

3) The AMF transmits the SM request message to the SMF. The SM request message may include a subscriber permanent ID, DNN, S-NSSAI, PDU session ID, AMF ID, N1 SM information, user location information, and an access technology type. The N1 SM information may include a PDU session ID and a PDU session establishment request message.

The AMF ID is used to identify the AMF serving the UE. The N1 SM information may include a PDU session establishment request message received from the UE.

4a) SMF transmits subscriber data request message to UDM. The subscriber data request message may include a permanent subscriber ID and DNN.

If the request type indicates "existing PDU session" in step 3 above, the SMF determines that the request is due to handover between 3GPP access and non-3GPP access. The SMF may identify an existing PDU session based on the PDU session ID.

If the SMF has not yet retrieved the SM related subscription data for the UE related to the DNN, the SMF may request the subscription data.

4b) The UDM may send a subscription data response message to the SMF.

The subscription data may include information about an authenticated request type, an authenticated SSC mode, and a basic QoS profile.

The SMF may check whether the UE request complies with user subscription and local policies. Alternatively, the SMF rejects the UE request through the NAS SM signaling (including the relevant SM rejection cause) delivered by the AMF, and the SMF informs the AMF that the PDU session ID should be considered released.

5) SMF sends a message to DN through UPF.

Specifically, when the SMF needs to authorize/authenticate the establishment of a PDU session, the SMF selects the UPF and triggers the PDU.

If the PDU session establishment authentication/authorization fails, the SMF terminates the PDU session establishment procedure and notifies the UE of rejection.

6a) When dynamic Policy and Charging Control (PCC) is deployed, the SMF selects a PCF.

6b) SMF may initiate PDU-CAN session establishment towards PCF to obtain basic PCC rules for PDU session. If the request type in step 3 indicates "existing PDU session", the PCF may start modifying the PDU-CAN session instead.

7) If the request type in step 3 indicates "initial request", the SMF selects the SSC mode for the PDU session. If step 5 is not performed, SMF can also select UPF. In case of the request type IPv4 or IPv6, the SMF may allocate an IP address/prefix for the PDU session.

8) If the dynamic PCC is deployed and the PDU-CAN session establishment is not yet completed, the SMF may start the PDU-CAN session initiation.

9) If the request type indicates "initial request" and step 5 is not performed, the SMF may start the N4 session establishment procedure using the selected UPF, otherwise the N4 session modification procedure may be started by using the selected UPF.

9a) SMF sends N4 session establishment/modification request message to UPF. In addition, the SMF may provide packet detection, enforcement and reporting rules to be installed in the UPF for the PDU session. When the SMF is allocated CN tunnel information, the CN tunnel information may be provided to the UPF.

9b) The UPF may respond by sending an N4 session establishment/modification response message. When the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, QoS profile, and CN tunnel information. The N1 SM information may include a PDU session establishment acceptance message. The PDU session establishment accept message may include an allowed QoS rule, SSC mode, S-NSSAI, and an assigned IPv4 address.

The N2 SM information is information that the AMF should deliver to the RAN, and may include the following.
- CN tunnel information: This corresponds to the core network address of the N3 tunnel corresponding to the PDU session.
- QoS Profile: This is used to provide the RAN with a mapping between QoS parameters and QoS flow identifiers.
- PDU Session ID: This may be used to indicate to the UE the association between the PDU session and the AN resources for the UE by AN signaling to the UE.

Meanwhile, the N1 SM information includes a PDU session acceptance message that the AMF should provide to the UE.

Multiple QoS rules may be included in N1 SM information and N2 SM information in the PDU session establishment accept message.

The SM response message also contains the PDU Session ID and information allowing the AMF to determine which access should be used for the UE as well as which target UE.

11) AMF transmits an N2 PDU session request message to the RAN. The message may include N2 SM information and a NAS message. The NAS message may include a PDU session ID and a PDU session establishment acceptance message.

The AMF may transmit a NAS message including a PDU session ID and a PDU session establishment accept message. In addition, the AMF transmits the received N2 SM information from the SMF to the RAN by including it in the N2 PDU session request message.

12) The RAN may do a specific signaling exchange with the UE related to the information received from the SMF.

The RAN also allocates RAN N3 tunnel information for the PDU session.

The RAN delivers the NAS message provided in step 10 to the UE. The NAS message may include a PDU session ID and N1 SM information. The N1 SM information may include a PDU session establishment acceptance message.

The RAN sends the NAS message to the UE only when the necessary RAN resources are established and the allocation of the RAN tunnel information is successful.

13) The RAN transmits an N2 PDU session response message to the AMF. The message may include a PDU session ID, cause, and N2 SM information. The N2 SM information may include a PDU session ID, (AN) tunnel information, and a list of allowed/rejected QoS profiles.
- RAN tunnel information may correspond to the access network address of the N3 tunnel corresponding to the PDU session.

14) The AMF may transmit the SM request message to the SMF. The SM request message may include N2 SM information. Here, the AMF may be to transfer the N2 SM information received from the RAN to the SMF.

15a) If the N4 session for the PDU session is not already established, the SMF may start the N4 session establishment procedure together with the UPF. If not, the SMF can use the UPF to initiate the N4 session modification procedure. The SMF may provide AN tunnel information and CN tunnel information. The CN tunnel information may be provided only when the SMF selects the CN tunnel information in step 8.

15b) The UPF may transmit an N4 session establishment/modification response message to the SMF.

16) The SMF may transmit the SM response message to the AMF. After this process, the AMF may deliver the related event to the SMF. It occurs during handover when RAN tunnel information is changed or AMF is relocated.

17) SMF transmits information to UE through UPF. Specifically, in the case of PDU Type IPv6, the SMF may generate an IPv6 Router Advertisement and transmit it to the UE through N4 and UPF.

18) If the PDU session establishment request is due to a handover between 3GPP access and non-3GPP access, that is, if the request type is set to "existing PDU session", the SMF release user plane through source access (3GPP or non-3GPP access), the 19) If the ID of the SMF is not included in process 4b by the UDM of the DNN subscription context, the SMF may call "UDM_Register UE serving NF service" including the SMF address and DNN. The UDM may store the ID, address and associated DNN of the SMF.

If the PDU session establishment is not successful during the procedure, the SMF informs the AMF.

<Multi-Access (MA) PDU Session>

The MA PDU session is a session that can be serviced simultaneously with 3GPP access and non-3GPP access using one PDU session.

Figure 10:
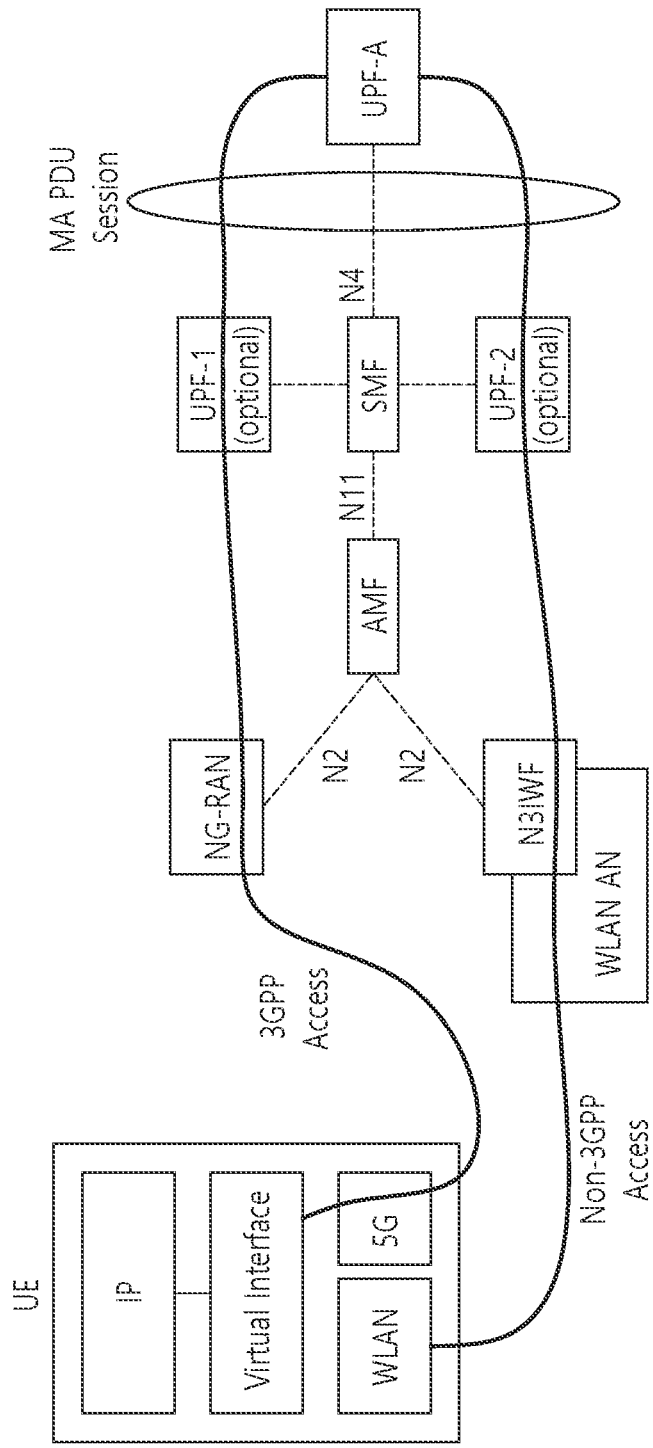
FIG. 10 shows an example in which a MA PDU session is generated.

FIG. 10 shows an example in which a MA PDU session is generated.

The MA PDU session is one PDU session in FIG. 10 and has a separate session tunnel for each access. One is established on 3GPP access, and the other PDU session is established on untrusted non-3GPP access (e.g., WLAN AN).

Since it is one session in the MA-PDU session, the MA PDU session has the following characteristics.
(i) one DNN;
(ii) one UPF anchor (UPF-A);
(iii) one PDU type (eg, IPv6);
(iv) one session IP address
(v) one SSC mode
(vi) one HPLMN S-NSSAI.

The MA-PDU session enables a multipath data link between the UE and UPF-A. This may be implemented below the IP layer.

A MA-PDU session may be established through one among the following procedures.
(i) It can be established through two separate PDU session establishment procedures. This is called individual establishment.
(ii) It may be established through one MA PDU session establishment procedure. That is, the MA PDU session is simultaneously established in two accesses with one session creation request. This is called combined establishment.

After the MA-PDU session is established, SM (Session Management) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure to add non-3GPP access to the MA PDU session created on 3GPP access on non-3GPP access. The request type in the establishment request message for adding the second access may be set to "MA PDU Request".

B. Establish a Bond

A MA PDU session may be established for 3GPP access and non-3GPP access at the same time through one procedure. One such procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

<PS Data Off>

When 3GPP PS Data Off is configured by HPLMN and is enabled by the user, 3GPP PS Data Off is a function to prevent transmitting of all data packets except IP packets required for 3GPP PS Data Off's Exempt Services via PDN connection on the 3GPP access network.

The 3GPP system shall provide a mechanism for operators to configure operator services, defined as Exempt Services of 3GPP PS Data Off, for their subscribers.

For consistency, if 3GPP PS Data Off is enabled on the UE:

The UE shall inform the network that 3GPP PS Data Off has been activated.

The UE shall stop the transmission of uplink IP packets of all services other than 3GPP PS Data Off's Exempt Services.

The network shall stop sending downlink IP packets to the UE for all services other than 3GPP PS Data Off's Exempt Services.

The UE shall stop sending uplink traffic via non-IP PDN types.

The network shall stop sending downlink traffic via non-IP PDN types.

Note 1: Traffic must be disabled on both the uplink and downlink to provide consistency in billing between HPLMN and VPLMN and between what users expect and what they can be billed for.

Each of the following operator services can be configured by HPLMN operators as part of 3GPP PS Data Off Exempt service.

MMTel negative;
SMS via IMS;
USSD (USSI) via IMS
MMTel video;
specific IMS services not defined by 3GPP (each IMS service is identified by an IMS communication service identifier)
Device management via PS
Management of USIM files via PS (e.g. using Bearer Independent Protocol) and
Configuration of IMS Supplementary Service over Ut interface using XCAP.

3GPP PS Data Off can be activated according to roaming status, and HPLMN may configure up to 2 sets of 3GPP PS Data Off Exempt Services for subscribers. One is in HPLMN and the other is used for roaming.

Note 2: Updates to the 3GPP Data Off Exception Service Set configured in VPLMN and HPLMN are not guaranteed to be applied in real time. There is no guarantee that updates to the 3GPP data off exception service set configured in the UE are applied in real time.

The user should know the operator service, which is the 3GPP PS Data Off Exempt service.

Note 3: The system may support fallback to work over the CS domain if the operator service is not configured as a 3GPP PS data off exception service and there is an equivalent CS domain operator service for the operator service.

II. Problems to be Solved in the Disclosure of this Specification

In 5G mobile communication, the 3GPP Data Off function may be used. Discussion is ongoing that 3GPP Data Off should be supported even for MA PDU sessions. However, conventionally, when 3GPP Data Off is used for the MA PDU session, a method for supporting efficient communication has not been discussed.

Hereinafter, examples of problems to be solved in the disclosure of the present specification will be described.

For the MA PDU session, there was a discussion on whether to support the processing of PS Data Off. The following were discussed. The 3GPP PS Data Off function can be applied only to the 3GPP access side of the MA PDU session. When the 3GPP PS Data Off status is activated for the UE with the MA PDU session, uplink traffic and downlink traffic for the MA PDU session through non-3GPP access may continue to follow the intended ATSSS rule.

That is, when the 3GPP PS Data Off function is used for the MA PDU Session, PS Data Off may be applied to 3GPP access and PS Data Off may not be applied to non-3GPP access. However, in this case, there is no discussion on how to enable "applying PS Data Off for 3GPP access and not applying PS Data Off for non-3GPP access".

In the conventional general PDU session, the subject performing the PS Data off processing is different according to the provided service. In the case of Internet Protocol Multimedia Subsystem (IMS) service, the IMS network processed PS Data off, and in the case of non-IMS service, the core network processed PS Data off. Here, the PS Data off-related process refers to a process of blocking/allowing data access to the terminal according to the case that the PS Data off status of the terminal is activated/deactivated.

In case of IMS service, Proxy-Call Session Control Function (P-CSCF), Serving Call Session Control Function (S-CSCF) and/or AS (application server) (e.g., IMS AS) perform processing related to PS Data Off for the IMS service to the terminal. Since the IMS itself processes PS Data Off, the PCF does not block the IMS service through gate control.

The UE may transmit status information indicating the status (e.g., activated) of PS Data Off to the S-CSCF through SIP signaling (registration/re-registration). Then, the status information transmitted by the UE may be transmitted to the AS through 3rd party registration. Since the AS is configured with the 3GPP PS Data Off exception service (Exempt Service), the AS may perform PS Data Off processing according to the PS Data Off status. For example, if PS Data Off status is activated, AS may provide service only for PS Data Off Exempt service, and AS may block services other than PS Data Off exception service (Exempt Service). Specifically, when the PS Data Off status is activated, when data related to the IMS service occurs for the UE, if the data corresponds only to the PS Data Off Exempt service, the service may be provided to the UE (e.g., SIP signaling transmission). If the data is not the PS Data Off Exempt service, service of the data may be blocked.

However, in the MA PDU session, the core network processes PS data OFF. This is because the UPF of the core network can know whether data access is by 3GPP or Non-3GPP.

However, in the MA PDU session, there is no discussion about who and how to process the PS Data off related to the IMS service.

When the PS Data off status is activated, even if IMS service is not the PS Data off exempt service, it is efficient to allow the IMS service to be provided through non-3GPP, so this is proposed.

III. Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementary.

In this specification, AS (Application Server) may be interpreted as IMS AS or SIP AS.

In this specification, 3GPP PS Data Off, PS Data Off, and Data Off may be used in combination.

In this specification, activating PS Data Off may be used in combination with activating PS Data Off, switching PS Data Off to active, and turning off Data. Deactivating PS Data Off may be used in in combination with deactivation of PS Data Off, switching PS Data Off to inactive, turning on data.

For reference, in order for a UE using the 3GPP system to receive IMS services such as voice call, video call, and SMS (eg, SMS over IP), the UE may be registered with the IMS network. In addition, the UE may periodically re-register with the IMS network.

Such signaling between the UE and the IMS may be performed through Session Initiation Protocol (SIP) signaling (or IMS signaling) between the IMS layer of the UE and the core IMS. Here, the IMS layer of the UE may be a layer included in the application layer of the UE. Here, the IMS layer of the UE may be an upper layer based on the NAS layer of the UE. The application layer of the UE may also be a higher layer based on the NAS layer of the UE. Depending on the implementation of the UE, the IMS layer of the UE and the application layer of the UE may be implemented separately from each other. Alternatively, the IMS layer of the UE may be included in the application layer of the UE. For reference, an operation performed by the IMS layer of the UE may also be performed by the application layer of the UE. IMS signaling may mean signaling between the IMS layer of the UE and the IMS network.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11A:
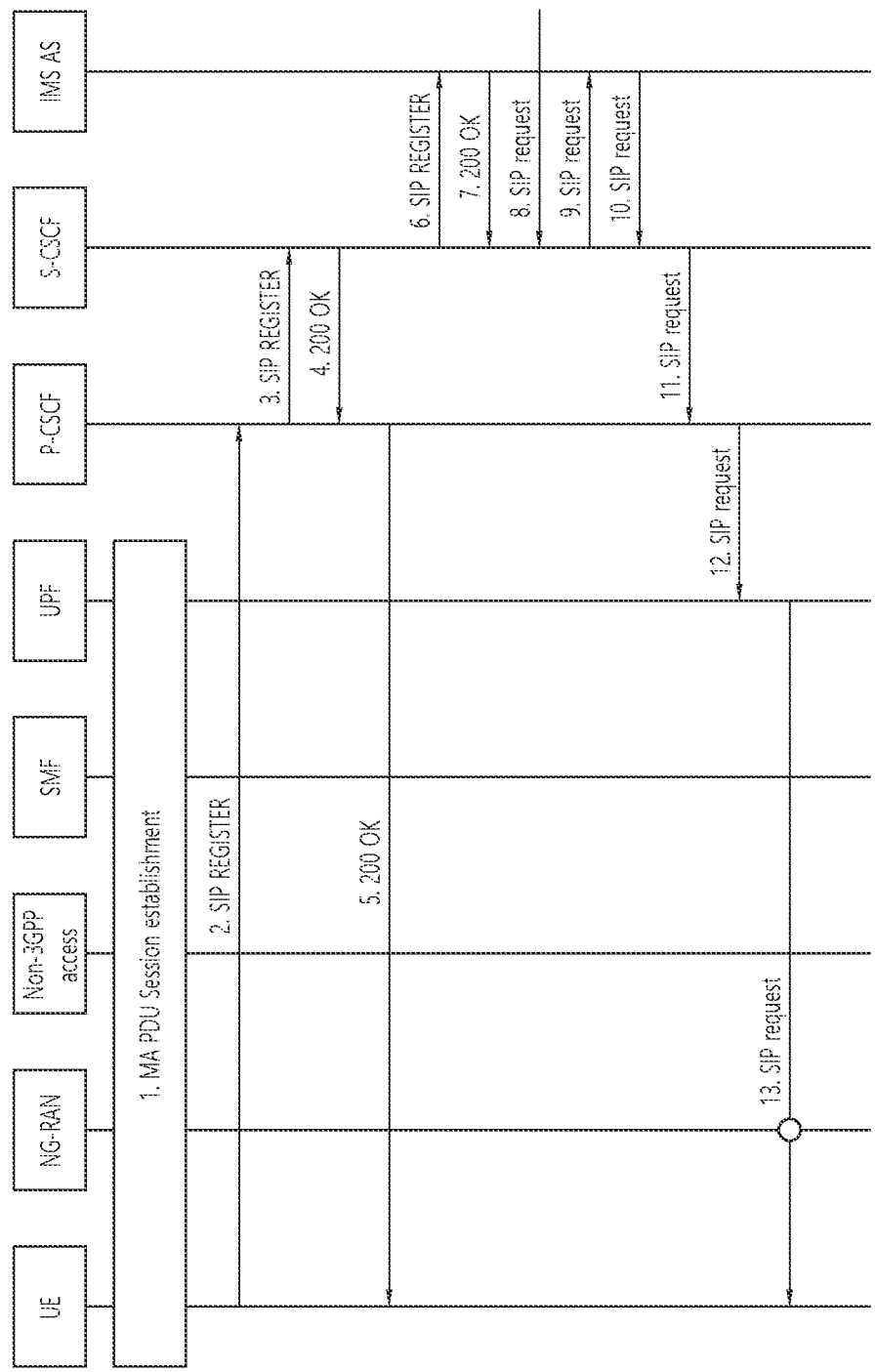
FIG. 11A and FIG. 11B are flowcharts illustrating the disclosure of the present specification.
Figure 11B:
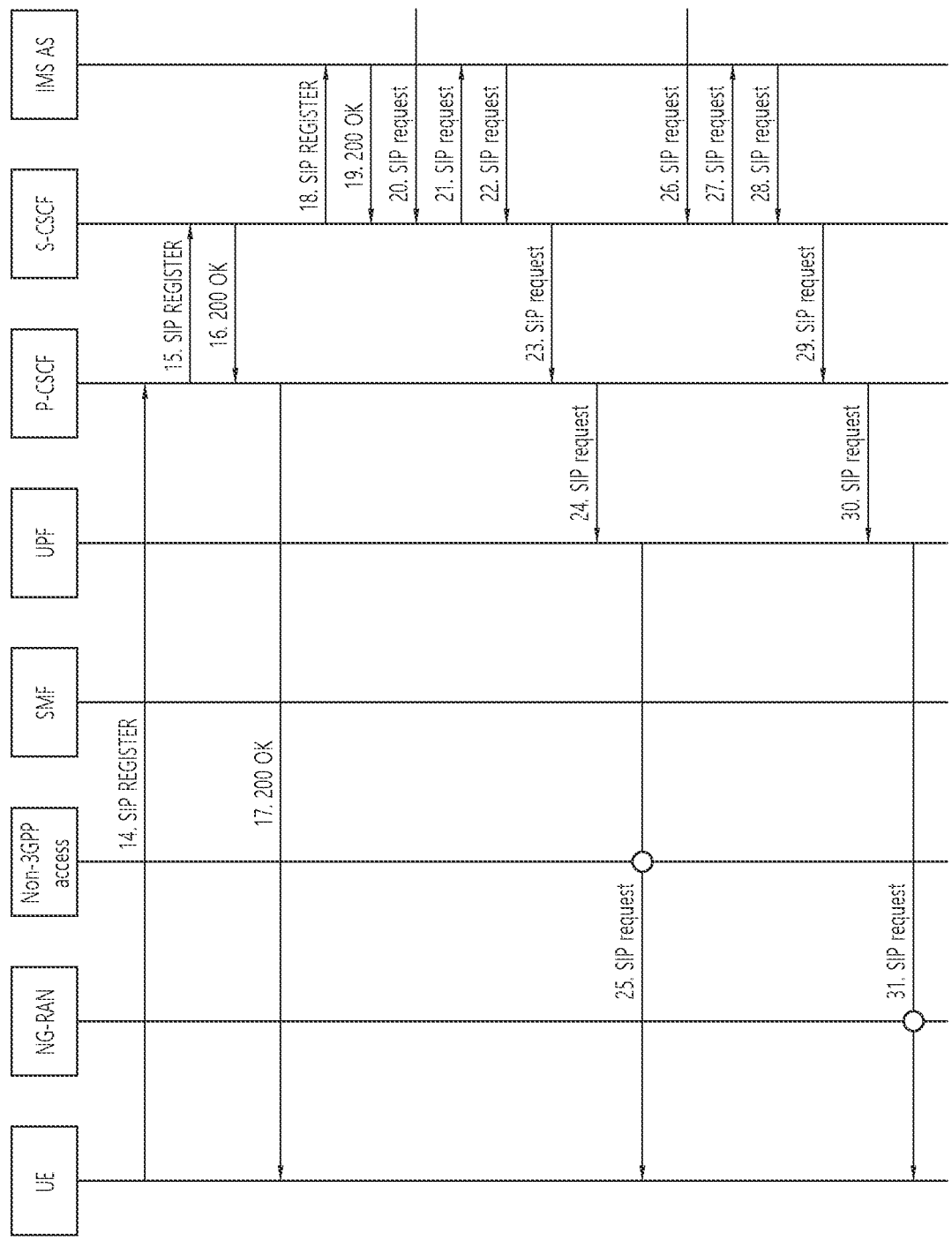

FIG. 11A and FIG. 11B are flowcharts illustrating the disclosure of the present specification.

1. The UE may register with 5GS. And, it is possible to form an MA PDU session with the 5G core network. This MA PDU session may be for IMS service.

2. The UE may transmit a SIP REGISTER message for registering with the IMS to the P-CSCF of the IMS network through the formed MA PDU Session. The UE may perform the SIP registration procedure through the MA PDU session.

The SIP registration message may include information indicating that the MA PDU session is used. Information indicating that it is a MA PDU Session may be explicit or implicit. For example, the SIP registration message may be transmitted by explicitly including information indicating that the UE uses the IMS service through the MA PDU Session. Alternatively, after the UE creates a MA PDU Session. IMS registration is performed through either 3GPP access or non-3GPP access, and additionally, IMS registration is performed with the same IP address/prefix through access different from the access that performed the first IMS registration. As it performs (by specifying multiple registration at this time), the IMS AS may recognize that the UE uses the IMS service through the MA PDU Session.

The use of the MA PDU session in the SIP REGISTER message may be interpreted in various ways, e.g. IMS registration is made through the MA PDU Session, or the IMS service can be serviced simultaneously with 3GPP access and non-3GPP access. Also, the number of MA PDU Sessions used for the IMS service may be plural depending on the service (e.g., MA PDU Session for MMTel voice/video. MA PDU Session for USSI).

As described above, the IMS AS may recognize that the MA PDU Session is used for the IMS service based on configuration or subscriber information, not based on the SIP registration message.

In addition, the UE may inform the IMS network of information on whether the status of PS Data Off is active or inactive. Here, the IMS network may include P-CSCF, S-CSCF, MMTEL, and IMS AS. Information on whether the status of PS Data Off is active or inactive may be included in the SIP registration message.

Steps 3-13 describe a case where the status (status) of PS Data Off is inactive, and steps 14-31 describe a case where the status (status) of PS Data off is active.

3. The S-CSCF may receive the SIP REGISTER message transmitted by the UE through the P-CSCF.

4. The S-CSCF may transmit a 200 OK message, which is a response message to IMS registration, to the P-CSCF.

5. The 200 OK message may be transmitted to the UE through the P-CSCF.

6. S-CSCF may deliver the SIP REGISTER message received from the UE to the IMS Application Server (AS) that processes PS Data Off.

The IMS AS may recognize that the MA PDU Session is used for the IMS service. And, The IMS AS may recognize that the status (status) of the PS Data Off of the UE is inactive.

7. The IMS AS may respond 200 OK message to the S-CSCF.

8. The S-CSCF may receive a terminating SIP request to the UE. This may be various SIP methods, for example, SIP INVITE, SIP MESSAGE, and the like. The terminating SIP request may be a message for requesting or providing an IMS service to the UE.

9. The S-CSCF may forward the terminating SIP request to the IMS AS.

10. Since the status of the UE's PS Data Off is inactive and the IMS AS is also aware of this, the IMS AS does not need to perform any action related to the PS Data Off. The IMS AS may transmit a terminating SIP request to the S-CSCF.

11. The S-CSCF may send a terminating SIP request to the P-CSCF.

12. The P-CSCF may send a terminating SIP request to the UPF.

13. The UPF may transmit a terminating SIP request to the UE based on the Multi-Access Rule. The UPF may transmit a terminating SIP request to the UE through the NG-RAN.

After the UE receives the SIP request, a related SIP request processing operation may be performed.

14. A case in which the status of PS Data Off of the UE is activated will be described. The UE may send a SIP REGISTER message to the IMS. The SIP REGISTER message may include information indicating that the PS Data Off status of the UE is active.

The SIP REGISTER message may include information indicating that the MA PDU Session is used for the IMS service. The information on the MA PDU Session may be included in the SIP REGISTER message, or may be included only when initial IMS registration and change occurs (e.g., when the MA PDU Session is used for the IMS service and the general PDU Session is used).

15. The S-CSCF may receive the SIP REGISTER message sent by the UE through the P-CSCF.

16. The S-CSCF may transmit a 200 OK message, which is a response message for IMS registration, to the P-CSCF.

17. The 200 OK message may be transmitted to the UE through the P-CSCF.

18. The S-CSCF may deliver the SIP REGISTER message received from the UE to the IMS Application Server (AS) that processes PS Data Off.

The IMS AS may recognize that the status of PS Data Off of the UE is activated. Also, the IMS AS may recognize that the MA PDU Session is used for the IMS service.

19. The IMS AS may respond to the S-CSCF with a 200 OK message.

Steps 20-25 describe a case that is not the PS Data Off exception service (Exempt Service), and steps 26-31 describe a case corresponding to the PS Data Off exception service (Exempt Service).

20. The S-CSCF may receive a terminating SIP request to the UE. This may be various SIP methods, for example, SIP INVITE, SIP MESSAGE, and the like. The terminating SIP request may be a message for requesting or providing an IMS service to the UE.

21. The S-CSCF may forward the terminating SIP request to the IMS AS.

22. Since the IMS AS recognizes that the PS Data Off status of the UE is active and the MA PDU Session is being used for the IMS service, the IMS AS may determine whether the terminating SIP request to the UE corresponds to Exempt Service of SIP-based 3GPP PS Data Off (or whether it is set as Exempt Service of SIP-based 3GPP PS Data Off).

As a result of the determination, if the terminating SIP request corresponds to the SIP-based 3GPP PS Data Off Exempt Service, information indicating that the PS Data Off Exempt Service may be included in the SIP request. As a result of the determination, if the terminating SIP request does not correspond to the SIP-based 3GPP PS Data Off's Exempt Service, information indicating that the SIP request is not the PS Data Offs Exempt Service may be included. Alternatively, information may be included in only one of the two cases, which may be applied throughout the present specification.

Information indicating PS Data Off Exempt Service is an or Information indicating not PS Data Off Exempt Service may be included by defining a new header in the SIP message, or adding a new tag to the existing header, or may be included in the SDP part. That is, the information may be expressed in various forms.

The IMS AS may include information indicating that PS Data Off has been activated or is being applied in addition to the terminating request directed to the UE.

The IMS AS may transmit the SIP request including the above-mentioned information (in this case, the information not the PS Data Off Exempt Service) to the S-CSCF.

For reference, the IMS AS doesn't perform discarding or blocking the transmission of the terminating SIP request to the UE because the MA PDU Session is used for the IMS service although PS Data Off of the UE is activated. When the IMS AS is a USSI AS, although PS Data Off of the UE is active, the MA PDU Session is used for the IMS service, so a network initiated USSD request procedure or a network initiated USSD notification procedure is performed.

23. The S-CSCF may send a terminating SIP request to the P-CSCF.

24. The P-CSCF may receive a terminating SIP request. The terminating SIP request may include information indicating that it is not an Exempt Service of PS Data Off. The P-CSCF may include information indicating that the terminating SIP request is not an Exempt Service of PS Data Off in the header of the IP packet including the terminating SIP request.

A DSCP value (TOS in IPv4/TC in IPv6) may be used to include information indicating that it is an Exempt Service of PS Data Off or information indicating that it is not an Exempt Service of PS Data Off. However, it is not limited to the dscp value and various IP header fields may be used.

The P-CSCF may send a terminating SIP request to the UPF.

25. The UPF may recognize that the terminating SIP request is not the PS Data Off Exempt Service through the header of the IP packet including the SIP request. This packet may recognize that 3GPP access through NG-RAN cannot be used, and it may be determined. This is because when the terminating SIP request does not correspond to the PS Data Off exception service, it can be transmitted to the UE only through non-3GPP access. The UPF may transmit the IP packet to the UE through non-3GPP access.

After the UE receives the SIP request, a related SIP request processing operation may be performed.

26. The S-CSCF may receive a terminating SIP request to the UE. This may be various SIP methods, for example, SIP INVITE, SIP MESSAGE, and the like. The terminating SIP request may be a message for requesting or providing an IMS service to the UE.

27. The S-CSCF may forward the terminating SIP request to the IMS AS.

28. Since the IMS AS recognizes that the UE's PS Data Off status is active and the MA PDU Session is being used for the IMS service, the IMS AS may determine whether the terminating SIP request to the UE corresponds SIP-based 3GPP PS Data Off Exempt Service (or whether it is set as Exempt Service of SIP-based 3GPP PS Data Off).

As a result of the determination, if the terminating SIP request corresponds to the SIP-based 3GPP PS Data Off Exception Service, information indicating that the terminating SIP request corresponds to the SIP-based 3GPP PS Data Off Exception Service may be included in the SIP request. As a result of the determination, if the terminating SIP request does not correspond to the SIP-based 3GPP PS Data Off's Exempt Service, information indicating that the terminating SIP request does not correspond to the SIP-based 3GPP PS Data Off Exception Service may be included in the SIP request.

Information indicating whether the terminating SIP request corresponds to the SIP-based 3GPP PS Data Off Exception Service or not may be included by defining a new header in the SIP message, or adding a new tag to the existing header, or may be included in the SDP part. That is, the information may be expressed in various forms.

The IMS AS may include information indicating that the status of PS Data Off has been activated or is being applied in addition to the terminating request directed to the UE.

The IMS AS may transmit the SIP request including the above-mentioned information (in this case, the information that the terminating SIP request corresponds to the PS Data Off Exempt Service) to the S-CSCF.

For reference, the IMS AS doesn't perform discarding or blocking the transmission of the terminating SIP request to the UE because the MA PDU Session is used for the IMS service although PS Data Off of the UE is activated.

The reason why the IMS AS performs this step may be interpreted as to instruct the P-CSCF to operate on 3GPP PS Data Off or to initiate the enforce for 3GPP PS Data Off to the P-CSCF.

29. The S-CSCF may send a terminating SIP request to the P-CSCF.

30. The P-CSCF may receive a terminating SIP request. The terminating SIP request may include information corresponding to the PS Data Off Exempt service. The P-CSCF may include information indicating that the terminating SIP request corresponds to PS Data Off Exempt Service in the header of the IP packet including the terminating SIP request.

A DSCP value (TOS in IPv4/TC in IPv6) may be used to include information indicating that it is an Exempt Service of PS Data Off or information indicating that it is not an Exempt Service of PS Data Off. However, it is not limited to the dscp value and various IP header fields may be used.

The P-CSCF may send a terminating SIP request to the UPF.

31. The UPF may recognize that the terminating SIP request corresponds to the PS Data Off Exempt Service through the header of the IP packet including the terminating SIP request. The UPF may recognize that this packet can be transmitted using 3GPP access through NG-RAN, and The UPF may determine this. This is because, when the terminating SIP request corresponds to PS Data Off Exempt Service, it can be transmitted to the UE through any access regardless of non-3GPP access/3GPP access. The UPF may transmit the packet to the UE through the NG-RAN and may also transmit the packet to the UE through non-3GPP access.

After the UE receives the SIP request, a related SIP request processing operation may be performed.

In the specification, a service that does not belong to PS Data Off Exempt Service and PS Data Off Exempt Service (which may also be referred to as PS Data Off Non-Exempt Service) may be a SIP message and/or actual traffic (this is data, media, voice/video, etc.) for initiating this service.

In the present specification, indicating that it corresponds the PS Data Off Exempt Service may be interpreted as a service to which PS Data Off is not applied, indicating that the service is unrelated to PS Data Off, or being able to use 3GPP access for the corresponding service.

In this specification, indicating that it doesn't correspond the PS Data Off Exempt Service may be interpreted as indicating that it is a service to which PS Data Off is applied, indicating that the service is related to PS Data Off, or impossible to use 3GPP access for the corresponding service.

Figure 12:
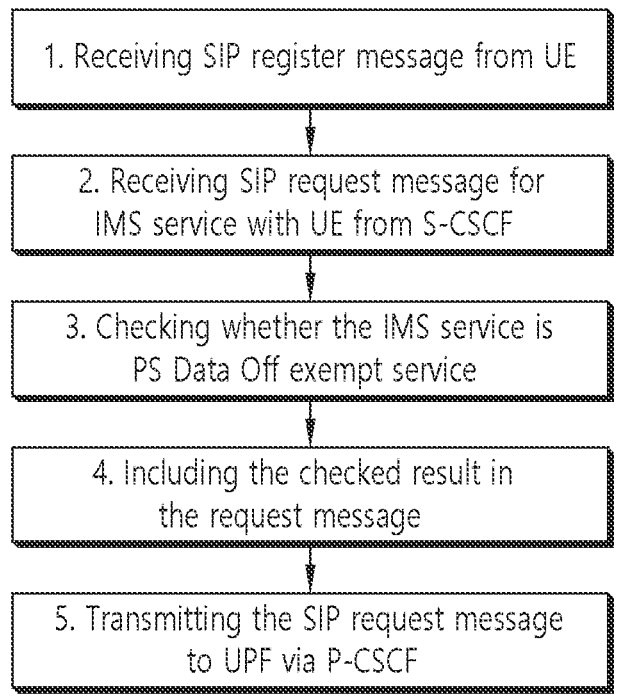

FIG. 12 is a flowchart illustrating a procedure performed by the AS.

1. The IMS Application Server (AS) that performs PS Data Off processing may receive the SIP registration message from the UE through P-CSCF and S-CSCF.

The SIP registration message may include information that the MA PDU session is used for the IMS service. In addition, the SIP registration message may include information indicating activation of the PS Data Off status of the UE.

The IMS AS may recognize that the MA PDU Session is used for the IMS service. And, The IMS AS may recognize that the status of the PS Data Off of the UE is activated.

2. The IMS AS may receive the terminating SIP request to the UE through the S-CSCF. This may be by various SIP methods, for example, SIP INVITE, SIP MESSAGE, and the like. The terminating SIP request may be a SIP request message for requesting or providing an IMS service to the UE.

3. Since the IMS AS recognizes that the PS Data Off status of the UE is active and the MA PDU Session is being used for the IMS service, the IMS AS may determine whether the terminating SIP request to the UE corresponds SIP-based 3GPP PS Data Off Exempt Service (or is set as the SIP-based 3GPP PS Data Off Exempt Service) or not.

4. As a result of the determination, if the terminating SIP request corresponds to the SIP-based 3GPP PS Data Off Exempt Service, information indicating that the terminating SIP request corresponds to the SIP-based 3GPP PS Data Off Exempt Service may be included in the SIP request. As a result of the determination, if the terminating SIP request does not correspond to the SIP-based 3GPP PS Data Off's Exempt Service, information indicating that the terminating SIP request does not correspond to the SIP-based 3GPP PS Data Off's Exempt Service may be included in the SIP request.

Information indicating PS Data Off Exempt Service is an or Information indicating not PS Data Off Exempt Service may be included by defining a new header in the SIP message, or adding a new tag to the existing header, or may be included in the SDP part. That is, the information may be expressed in various forms.

5. The IMS AS may transmit a SIP request (SIP request message) including the above-mentioned information (in this case, information not an Exempt Service of PS Data Off) to UPF through S-CSCF and P-CSCF.

The subsequent procedure is replaced by the description of FIG. 11.

Figure 13:
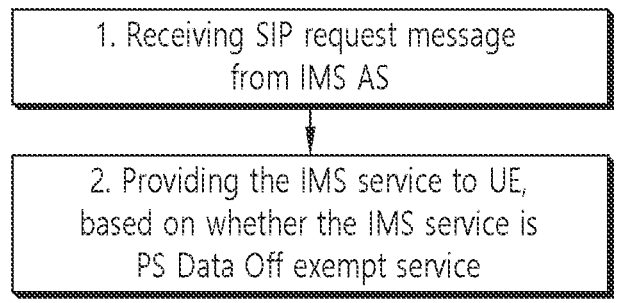
FIG. 13 is a flowchart illustrating a procedure performed by the UPF.

FIG. 13 is a flowchart illustrating a procedure performed by the UPF.

1. The UPF may receive the SIP request message from the IMS AS.

2. The UPF may recognize that the terminating SIP request is not the PS Data Off Exempt Service through the header of the IP packet including the SIP request. The UPF may recognize that this packet cannot be used 3GPP access through NG-RAN, and The UPF may determine this. This is because, when the terminating SIP request does not correspond to the PS Data Off Exempt Service, terminating SIP request can be transmitted to the UE only through non-3GPP access. The UPF may transmit the IP packet to the UE through non-3GPP access.

The UPF may recognize that the terminating SIP request corresponds to the PS Data Off Exempt Service through the header of the IP packet including the terminating SIP request. The UPF may recognize that this packet can be used 3GPP access through NG-RAN, and The UPF may determine this. This is because, when the terminating SIP request corresponds to the PS Data Off Exempt Service, terminating SIP request can be transmitted to the UE through any access regardless of non-3GPP access/3GPP access. The UPF may transmit the packet to the UE through the NG-RAN and may also transmit the packet to the UE through non-3GPP access.

The subsequent procedure is replaced by the description of FIG. 11.

Figure 14:
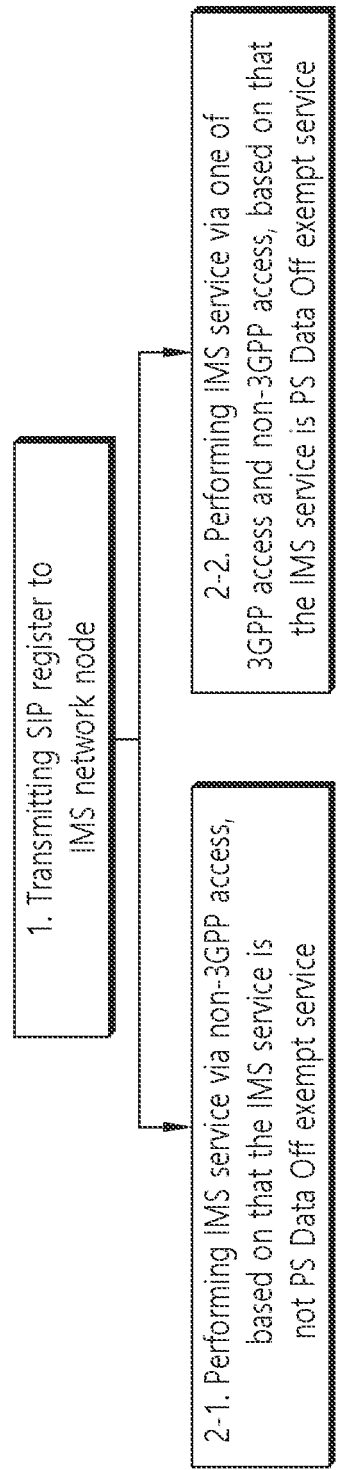
FIG. 14 is a flowchart illustrating a procedure performed by the UE.

FIG. 14 is a flowchart illustrating a procedure performed by the UE.

1. The UE may register with 5GS. And, it is possible to form an MA PDU session with the 5G core network. This MA PDU session may be for IMS service. The UE may transmit a SIP REGISTER message for registration to the IMS through the formed MA PDU Session to a network node (e.g., P-CSCF) of the IMS network. The UE may perform the SIP registration procedure through the MA PDU session.

The SIP registration message may include information indicating that the MA PDU session is used. Information on MA PDU Session may be explicit or implicit. For example, the SIP registration message may be transmitted by explicitly including information indicating that the UE uses the IMS service through the MA PDU Session. Alternatively, after the UE creates a MA PDU Session, IMS registration is performed through either 3GPP access or non-3GPP access, and additionally, IMS registration is performed with the same IP address/prefix through access different from the access that performed the first IMS registration. As it performs (by specifying multiple registration at this time), the IMS AS may recognize that the UE uses the IMS service through the MA PDU Session.

Information indicating that the MA PDU session is used in the SIP REGISTER message may be interpreted as various ways, e.g., the IMS service is serviced through multiple accesses, or IMS registration is made through the MA PDU Session, or the IMS service can be serviced simultaneously with 3GPP access and non-3GPP access. Also, the number of MA PDU Sessions used for the IMS service may be plural depending on the service (e.g., MA PDU Session for MMTel voice/video, MA PDU Session for USSI).

In addition, the UE may inform the IMS network of information on whether the status of PS Data Off is active or inactive. Here, the IMS network may include P-CSCF, S-CSCF, MMTEL AS, and IMS AS. Information on whether the status of PS Data Off is active or inactive may be included in the SIP registration message. Here, the description will be made only when the status of PS Data Off is active. Accordingly, the terminal may include information indicating that the status of PS Data Off is active in the SIP registration message.

Although the status of PS Data Off of the UE is active, the operation of the UE differs as follows depending on whether the IMS service corresponds to the PS Data Off Exempt service or not.

2-1. If the IMS service does not correspond to the PS Data Off Exempt service, the UE cannot perform the IMS service with 3GPP access and may perform the IMS service with the non-3GPP access. In this case, the UE may communicate using a wifi, etc., which does not charge data.

2-2. If the IMS service corresponds to the PS Data Off Exempt service, the UE may perform the IMS service through any access regardless of 3GPP access/non-3GPP access.

The present specification may have various effects.

For example, through the method disclosed herein, the IMS service can be effectively provided to the UE in the MA PDU session.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method comprising:
receiving, by an IMS AS (Internet Protocol Multimedia Subsystem Application Server), a SIP (Session Initiation Protocol) registration message generated by a UE (User Equipment) via a P-CSCF (Proxy-Call Session Control Function) and an S-CSCF (Serving Call Session Control Function);

wherein the SIP registration message includes specific information that an IMS service is performed through MA (Multi Access) PDU (Packet Data Unit) session, wherein the SIP registration message includes status information indicating that a state of PS Data Off of the UE is active;

receiving, by the IMS AS, a SIP request message for requesting the IMS service for the UE from the S-CSCF;

determining, by the IMS AS, whether the SIP request message corresponds to PS Data Off exempt service, based on the specific information and the status information;

including a result of the determination in the SIP request message; and transmitting, by the IMS AS to a UPF (User Plane Function), the SIP request message with the result of the determination through the S-CSCF and the P-CSCF.

2. The method of claim 1, further comprising:

including, by the IMS AS, the status information in the SIP request message.

3. The method of claim 1, wherein the SIP request message is SIP message.

4. A method comprising:

performing, by an UPF (User Plane Function), establishment of MA (Multi Access) PDU (Packet Data Unit) session for a UE (User Equipment);

receiving, by the UPF, a SIP (Session Initiation Protocol) request message for IMS (Internet Protocol Multimedia Subsystem) service for the UE, from an IMS AS (application server), wherein the SIP request message includes status information indicating that a state of PS Data Off of the UE is active, wherein the SIP request message includes information on whether the SIP request message corresponds to PS Data Off exempt service;

transmitting, by the UPF to the UE, a packet in the SIP request message via a non-3GPP access of the MA PDU session, based on the SIP request message not corresponding the PS Data Off exempt service; and transmitting, by the UPF to the UE, a packet in the SIP request message via either a 3GPP access of the MA PDU session or a non-3GPP access of the MA PDU session, based on the SIP request message corresponding the PS Data Off exempt service.

5. The method of claim 4, further comprising:

including, by the UPF, the status information in the SIP request message.

6. The method of claim 4, wherein the SIP request message is SIP message.

7. A method comprising:

performing, by a UE (User Equipment), establishment of MA (Multi Access) PDU (Packet Data Unit) session;

transmitting, by the UE, a SIP (Session Initiation Protocol) registration message via a P-CSCF (Proxy-Call Session Control Function) and an S-CSCF (Serving Call Session Control Function), to an IMS AS (Internet Protocol Multimedia Subsystem Application Server), wherein the SIP registration message includes information that an IMS (Internet Protocol Multimedia Subsystem) service is performed through the MA PDU session, wherein the SIP registration message includes status information indicating that a state of PS Data Off of the UE is active;

receiving, by the UE from an UPF (User Plane Function), a packet in a SIP request message for requesting the IMS service for the UE via a non-3GPP access of the MA PDU session, based on the SIP request message not corresponding the PS Data Off exempt service; and receiving, by the UE from the UPF, a packet in the SIP request message via either a 3GPP access of the MA PDU session or a non-3GPP access of the MA PDU session, based on the SIP request message corresponding the PS Data Off exempt service.

* * * * *